US006201552B1

(12) United States Patent
Itou et al.

(10) Patent No.: US 6,201,552 B1
(45) Date of Patent: Mar. 13, 2001

(54) INFORMATION PROCESSING DEVICE

(75) Inventors: Megumi Itou, Nara; Susumu Hasegawa, Sakai; Hajime Watanabe; Yoshiko Imaki, both of Osaka, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/046,555

(22) Filed: Mar. 24, 1998

(30) Foreign Application Priority Data

Mar. 25, 1997 (JP) .................................................. 9-072245

(51) Int. Cl.$^7$ .................................................. G06T 11/00
(52) U.S. Cl. .............................................................. 345/468
(58) Field of Search ................................... 345/467–469, 345/473

(56) References Cited

U.S. PATENT DOCUMENTS

| 4,748,443 | | 5/1988 | Uehara et al. . | |
| 5,539,868 | | 7/1996 | Hosoya et al. . | |
| 5,727,140 | * | 3/1998 | Ohtomo et al. | 345/467 |
| 5,852,447 | * | 12/1998 | Hosoya et al. | 345/468 |
| 5,870,107 | * | 2/1999 | Fujisawa et al. | 345/467 |
| 5,930,408 | * | 7/1999 | Seto | 382/301 |
| 5,959,635 | * | 9/1999 | Watanabe et al. | 345/469 |

FOREIGN PATENT DOCUMENTS

| 62-26584 | 2/1987 | (JP) . |
| 3-216767 | 9/1991 | (JP) . |
| 6-102844 | 4/1994 | (JP) . |

OTHER PUBLICATIONS

"King Graph word–creating system", Arphic Technology Co., Ltd, Jan. 1997, pp. 4–1 –4–3 and 5–1 –5–5.

Singh et al, "Human Figue Synthesis and Animation for Virtual Space Teleconferencing", Proceedings of the Virtual Reality Annual International Symposium, Research Triangle Park, Mar. 11–15, 1995, pp. 118–126, XP000529978.

* cited by examiner

Primary Examiner—Mark R. Powell
Assistant Examiner—Motilewa Good-Johnson
(74) Attorney, Agent, or Firm—Nixon & Vanderhye P.C.

(57) ABSTRACT

An information processing device includes an element deforming section for transfer-deforming at least one of divided plurality of elements of a graphic character; and an output section for alternately outputting first display data of the element after being transfer-deformed by the element deforming section and second display data of the element before being transfer-deformed by the element deforming section by switching the first display data and the second display data. According to the described arrangement, a dynamic image of the graphic character can be displayed on a screen in such a manner that only a portion as desired of the element which constitutes the graphic character can be displayed on the screen. As a result, a dynamic image of the character or drawing can be displayed in a manner as desired by the user with ease without requiring a complicated process.

16 Claims, 29 Drawing Sheets

FIG. 5

4a : GRAPHIC CHARACTER SKELETON DATA MEMORY AREA
GRAPHIC CHARACTER SKELETON DATA

| CHARACTER CODE 3913<br>NUMBER OF SKELETONS 11 | | |
|---|---|---|
| STROKE ORDER CODE 1 | NUMBER OF SKELETONS 3 | ELEMENT CODE "2000" |
| SKELETON POINT CODE K101 | COORDINATE DATA OF K101 | |
| SKELETON POINT CODE K102 | COORDINATE DATA OF K102 | |
| SKELETON POINT CODE K103 | COORDINATE DATA OF K103 | |
| ⋮ | | |
| STROKE ORDER CODE 6 | NUMBER OF SKELETONS 2 | ELEMENT CODE "8000" |
| ⋮ | | |
| STROKE ORDER CODE 10 | NUMBER OF SKELETONS 3 | ELEMENT CODE "3010" |
| SKELETON POINT CODE K1001 | COORDINATE DATA OF K1001 | |
| SKELETON POINT CODE K1002 | COORDINATE DATA OF K1002 | |
| SKELETON POINT CODE K1003 | COORDINATE DATA OF K1003 | |
| STROKE ORDER CODE 11 | NUMBER OF SKELETONS 2 | ELEMENT CODE "1000" |
| ⋮ | | |

FIG. 6

4b : ELEMENT OUTLINE DATA MEMORY AREA
   ELEMENT OUTLINE DATA

| FONT TYPE CODE 2828 NUMBER OF ELEMENTS |||
|---|---|---|
| ELEMENT CODE "2000" | NUMBER OF OUTLINE POINTS 8 | POINTER TO OUTLINE POINT CODE |
| OUTLINE POINT |||
| | OUTLINE POINT CODE R20001 | COORDINATE DATA OF R20001 |
| | : | |
| | OUTLINE POINT CODE R20008 | COORDINATE DATA OF R20008 |
| : |||
| ELEMENT CODE "3010" | NUMBER OF OUTLINE POINTS 8 | POINTER TO OUTLINE POINT CODE |
| OUTLINE POINT |||
| | OUTLINE POINT CODE R30101 | COORDINATE DATA OF R30101 |
| | : | |
| | OUTLINE POINT CODE R30108 | COORDINATE DATA OF R30108 |
| |||
| : |||

FIG. 7

5a : TRANSFER TYPE DATA MEMORY AREA
    TRANSFER TYPE DATA

| CHARACTER CODE 3913<br>NUMBER OF SKELETONS 11<br>TRANSFER STROKE ORDER CODE 6.10 ||
|---|---|
| STROKE ORDER CODE 1 | TRANSFER TYPE CODE A |
| : ||
| STROKE ORDER CODE 6 | TRANSFER TYPE CODE E |
| : ||
| STROKE ORDER CODE 10 | TRANSFER TYPE CODE D |
| STROKE ORDER CODE 11 | TRANSFER TYPE CODE C |
| : ||
| TRANSFER TYPE CODE A PARALLEL TRANSFER ||
| TRANSFER TYPE CODE B INVERSE TRANSFER ||
| TRANSFER TYPE CODE C ROTATION TRANSFER ||
| TRANSFER TYPE CODE D SKELETON TRANSFER ||
| TRANSFER TYPE CODE E OUTLINE TRANSFER ||

FIG. 8

5 b : TRANSFER POSITION DATA MEMORY AREA
( TRANSFER POSITION DATA

CHARACTER CODE 3913
NUMBER OF SKELETONS 11
TRANSFER STROKE ORDER CODE 10
TRANSFER SKELETON POINT CODE k1003

| STROKE ORDER CODE 1 | NUMBER OF SKELETON POINTS 3 | |
|---|---|---|
| SKELETON POINT CODE k101 | COORDINATE DATA OF k101 AFTER TRANSFER | |
| SKELETON POINT CODE k102 | COORDINATE DATA OF k102 AFTER TRANSFER | |
| SKELETON POINT CODE k103 | COORDINATE DATA OF k103 AFTER TRANSFER | |
| STROKE ORDER CODE 2 | NUMBER OF SKELETON POINTS 4 | |
| : | | |
| STROKE ORDER CODE 10 | NUMBER OF SKELETON POINTS 3 | |
| SKELETON POINT CODE k1001 | COORDINATE DATA OF k1001 AFTER TRANSFER | |
| SKELETON POINT CODE k1002 | COORDINATE DATA OF k1002 AFTER TRANSFER | |
| SKELETON POINT CODE k1003 | COORDINATE DATA OF k1003 AFTER TRANSFER | |
| STROKE ORDER CODE 11 | NUMBER OF SKELETON POINTS 2 | |
| : | | |

FIG. 9

6 : DEFORMATION DATA MEMORY SECTION
   DEFORMATION DATA

| FONT TYPE CODE 2828 NUMBER OF ELEMENTS | | |
|---|---|---|
| ELEMENT CODE "2000" | NUMBER OF OUTLINE POINTS 8 | DEFORMATION CODE a |
| : | : | : |
| ELEMENT CODE "3010" | NUMBER OF OUTLINE POINTS 8 | DEFORMATION CODE a |
| : | : | : |
| ELEMENT CODE "8000" | NUMBER OF OUTLINE POINTS 10 | DEFORMATION CODE b |
| : | : | : |
| : | : | : |
| DIFFERENCE DEFORMATION DATA OF DEFORMATION CODE a | | |
| DEFORMATION CODE b | | |
| ELEMENT CODE "8000" | | |
| COORDINATE VALUE OF OUTLINE POINT CODE R80001 | | |
| : | | |
| COORDINATE VALUE OF OUTLINE POINT CODE R80010 | | |
| ELEMENT CODE "9000" | | |
| COORDINATE VALUE OF OUTLINE POINT CODE R90001 | | |
| : | | |

F I G. 1 0

7 : TRANSFER TIME DATA MEMORY SECTION

| CHARACTER CODE 3913 NUMBER OF SKELETONS 11 | | |
|---|---|---|
| STROKE ORDER CODE 1 | NUMBER OF SKELETONS 3 | |
| SKELETON CODE k101 | T101' -T101 | |
| : | | |
| STROKE ORDER CODE 6 | NUMBER OF SKELETON POINTS 4 | |
| SKELETON POINT CODE k601 | T601' -T601 | |
| : | | |
| STROKE ORDER CODE 10 | NUMBER OF SKELETON POINTS 3 | |
| SKELETON POINT CODE k1001 | T1001' -T1001 | |
| STROKE ORDER CODE 11 | NUMBER OF SKELETON POINTS 2 | |
| : | | |

FIG. 11

8: REPRODUCING TIME DATA MEMORY SECTION

| CHARACTER CODE 3913 <br> NUMBER OF SKELETONS 11 | | |
|---|---|---|
| STROKE ORDER CODE 1 | NUMBER OF SKELETONS 3 | |
| SKELETON POINT CODE k101 | T101"-T101' | |
| : | | |
| STROKE ORDER CODE 6 | NUMBER OF SKELETON POINTS 2 | |
| SKELETON POINT CODE k601 | T601"-T601' | |
| : | | |
| STROKE ORDER CODE 10 | NUMBER OF SKELETON POINTS 3 | |
| SKELETON POINT CODE k1001 | T1001"-T1001' | |
| STROKE ORDER CODE 11 | NUMBER OF SKELETON POINTS 2 | |
| : | | |

↓

↓

INFORMATION PROCESSING DEVICE

FIELD OF THE INVENTION

The present invention relates to information processing devices such as computers, word processors, etc., which can display a dynamic image of data such as characters, drawings, etc., on a screen.

BACKGROUND OF THE INVENTION

Conventionally, for the information processing devices such as computers, word processors, etc., which can display a dynamic image of data such as characters, drawings, etc., on a screen, for example, below-explained techniques disclosed by Japanese Unexamined Patent Publication No. 102844/1994 (Tokukaihei 6-102844), Japanese Unexamined Patent Publication No. 26584/1987 (Tokukaisho 62-26584), and Japanese Unexamined Patent Publication No. 216767/1991 (Tokukaihei 3-216767) have been used.

The image display device of Japanese Unexamined Patent Publication No. 102844/1994 is arranged so as to generate characters which move around in disorder by means of a random number generator without inputting display parameters. According to the above image display device, a dynamic image is prepared based on parameters for displaying characters or drawings, such as a scaling factor, an affine transformation parameter, a canadian transformation parameter, an outline width, a curvature, etc.

The curved surface preparing method of Japanese Unexamined Patent Publication No. 26584/1987 (Tokukaisho 62-26584) is arranged such that a free curved surface is prepared by partially deforming a part of the curved surface as specified, thereby forming the curved surface as desired step by step by an interactive operation practically at real time.

The image preparing device of Japanese Unexamined Patent Publication No. 216767/1991 is arranged such that composite parameters are prepared from parameters as input from an external section and parameters as stored in a main memory, and a dynamic image is formed at real time by deforming an image as input based on the resulting composite parameter.

However, according to the image display device of Japanese Unexamined Patent Publication No. 102844/1994, although a random movement of characters or drawings can be achieved by the random number generator, a movement of the characters or the drawings as the user desires cannot be obtained. Moreover, in the case of displaying a dynamic image of the characters or the drawings, etc., as it is required to input a plurality of parameters for displaying the characters, the drawings, etc., a dynamic image cannot be easily obtained.

According to the curved surface preparing method of Japanese Unexamined Patent Publication No. 26584/1987, although the curved surface can be deformed at real time, as a deformation is performed by transferring each point within a deformation area on a plane of the curved surface, it is not suited for preparing outlines, or the lines on the curved surface.

Furthermore, according to the image preparing device of Japanese Unexamined Patent Publication No. 216767/1991, three kinds of basic shape indicative data for the movement of the image data are required, and the image data is moved based on these three basic shape indicative data. Therefore, the method is not suited for processing a complicated deformation.

SUMMARY OF THE INVENTION

It is an object of the present invention to provide an information processing device which can easily display a dynamic image of characters, drawings, etc., as desired by a user without requiring a complicated process.

In order to achieve the above object, the information processing device of the present invention includes transfer-deformation processing structure for transfer-deforming at least one of divided plurality of elements which constitute an image of a graphic character; and output structure for alternately outputting first display data regarding an element of the image that has been transfer-deformed by the transfer-deformation processing structure and a second display data regarding the element before being transfer-deformed by the transfer-deformation processing structure by switching the first display data and the second display data.

According to the described arrangement, with respect to at least one of the divided elements of the graphic character which graphically shows a character, the output structure can alternately output display data for displaying the state before the transfer-deformation and the state after the transfer deformation, and thus a dynamic image of only the portion as desired of the elements which constitute the graphic character can be displayed on a screen. As a result, without requiring complicated processes, the user can display a dynamic image of characters, graphics, etc., on a screen with a simple operation as desired.

Therefore, the above arrangement enables a dynamic image of only a predetermined element of the graphic character to be displayed on the screen. As a result, a dynamic display of characters or drawings can be achieved easily without requiring a complicated process. Here, the first display data and the second display data may be prepared based on the graphic character data as stored in the information processing device beforehand or may be formed based on the graphic character data as input when necessary by means of an input.

For a fuller understanding of the nature and advantages of the invention, reference should be made to the ensuing detailed description taken in conjunction with the accompanying drawings.

BRIEF DESCRIPTION OF THE DRAWINGS

FIG. 5 is an explanatory view showing one example of the graphic character skeleton data stored in the graphic character skeleton data memory area of the graphic character data memory section of the information processing device of FIG. 1;

FIG. 6 is an explanatory view showing one example of the element outline data as stored in the element outline data memory section of the graphic character data memory section of the information processing device of FIG. 1;

FIG. 7 is an explanatory view showing one example of the transfer type data as stored in the transfer type data memory area of the transfer type data memory section of the information processing device of FIG. 1;

FIG. 8 is an explanatory view showing one example of the transfer type data as stored in the transferred position indicative data as stored in the transferred position indicative data memory section of the information processing device of FIG. 1;

FIG. 9 is an explanatory view showing one example of the deformation data as stored in the deformation data memory section of the information processing device of FIG. 1;

FIG. 10 is an explanatory view showing transfer time data as stored in the transfer time data memory section of the information processing device of FIG. 1;

FIG. 11 is an explanatory view showing one example of reproducing time data as stored in the reproducing time data memory section of the information processing device of FIG. 1;

DESCRIPTION OF THE EMBODIMENTS

Embodiment 1

The following descriptions will explain one embodiment of the present invention with reference to figures.

The information processing device in accordance with the present embodiment is provided in word processors, computers, etc., which display a dynamic image by transfer-deforming graphic characters which graphically shows characters.

Figure 1:
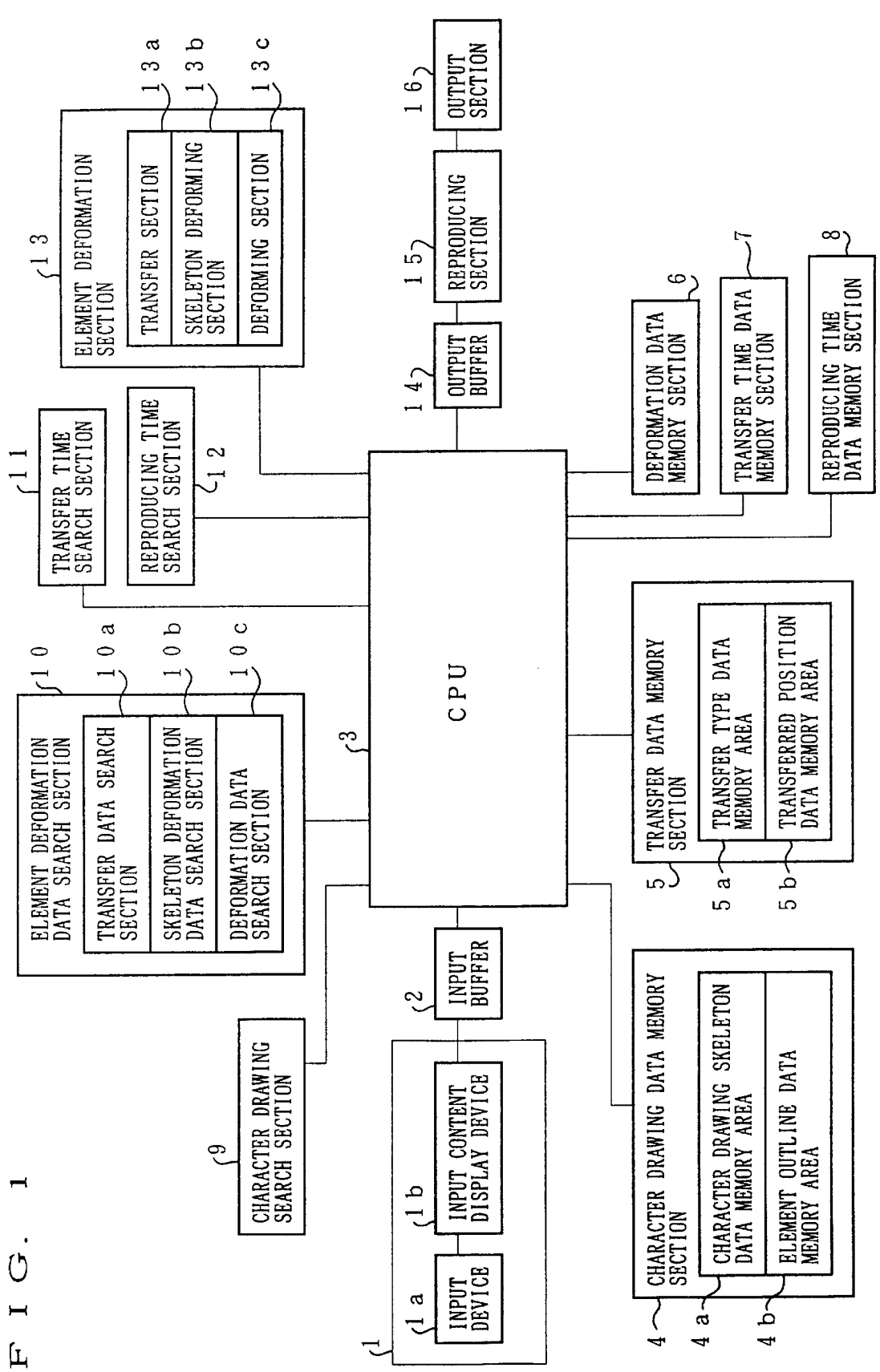
FIG. 1 is a block diagram schematically showing an information processing device of the present invention.

As shown in FIG. 1, the information processing device includes an input section 1 (input means), an input buffer 2, a CPU 3 (Central Processing Unit), a graphic character data memory section 4 (graphic character data memory means), a transfer data memory section 5 (transfer-deformation data memory means), a deformation data memory section 6 (transfer-deformation data memory means), a transfer time data memory section 7 (transfer time data memory means), a reproducing time data memory section 8 (reproducing time data memory means), a graphic character search section 9 (graphic character search means), an element deformation data search section 10 (element deformation data search means), a transfer time search section 11 (transfer time search means), a reproducing time search section 12 (reproducing time search means), an element deforming section 13 (element transfer-deforming section), an output buffer 14 (output means), a reproducing unit 15 (output means, transfer means), and an output section 16 (output means).

The respective sections of the information processing device will be explained in detail.

First, the explanations on the input section 1 and the input buffer 2 will be given, which constitute the data input section (input means) for permitting the user to input the display data such as a character code, a size, etc., of the graphic character for which a dynamic image is to be displayed.

The input section 1 is constituted by an input device 1a (selection means, data input means) such as a keyboard, a mouse, a tablet, etc., which are generally used for the word processors, computers, etc., and an input content display device 1b (input content display means) such as a liquid crystal display device, etc.

The input device 1a is provided for inputting graphic character data such as a character code, a size, etc., of the graphic character for which a dynamic image is to be displayed by the information processing device of the present embodiment. The input device 1a also functions as means for inputting parameters for use in processing a dynamic image display with respect to the graphic character. These parameters will be explained in detail later.

The input content display device 1b displays an input screen for an object to be transfer-deformed for selecting the element to be transfer-deformed such as a menu screen showing a transfer-deformation order for a dynamic image display (to be described later) based on the graphic character data as input by the input device 1a.

For the input content display device 1b, a display device, for example, a liquid crystal display device, used for the word processors, computers, etc., can be used without any modification. Namely, the input content display device 1b may be used also as the display device, for example, the liquid crystal display device, etc., to be used in the output section 16 (to be described later). It may be also arranged such that the input content display device 1b is used as the display device which is prepared separately from the output section 16.

The transfer-deforming processes using a menu screen to be displayed by the input content display device 1b will be described later.

The input buffer 2 temporarily stores the graphic character data as input by the input section 1, and outputs the display data to the CPU 3 which is the control means for controlling an entire image processing device at a predetermined timing.

The CPU 3 is the processing means for all the operations of the transfer-deformation process of the graphic character data such as the character code, the size of the graphic character as input via the input buffer 2. The CPU 3 stores therein a program memory and a work memory.

The work memory is an area for transfer-deforming the graphic character based on data from the graphic character data memory section 4, the transfer data memory section 5, the deformation data memory section 6, the transfer time data memory section 7, and the reproducing time data memory section 8 which store various types of data for the transfer-deformation of the graphic character corresponding to the graphic character as input.

In the program memory, a program is stored for reading the transfer-deformation data of the graphic character corresponding to the graphic character data as input from each memory section or a program for the transfer-deformation process to be applied to the graphic character.

The processes of transfer-deforming the graphic character by the CPU 3 will be described in detail later.

Here, explanations on the graphic character will be given through an example of the Chinese Character for "Cat".

Figure 2:
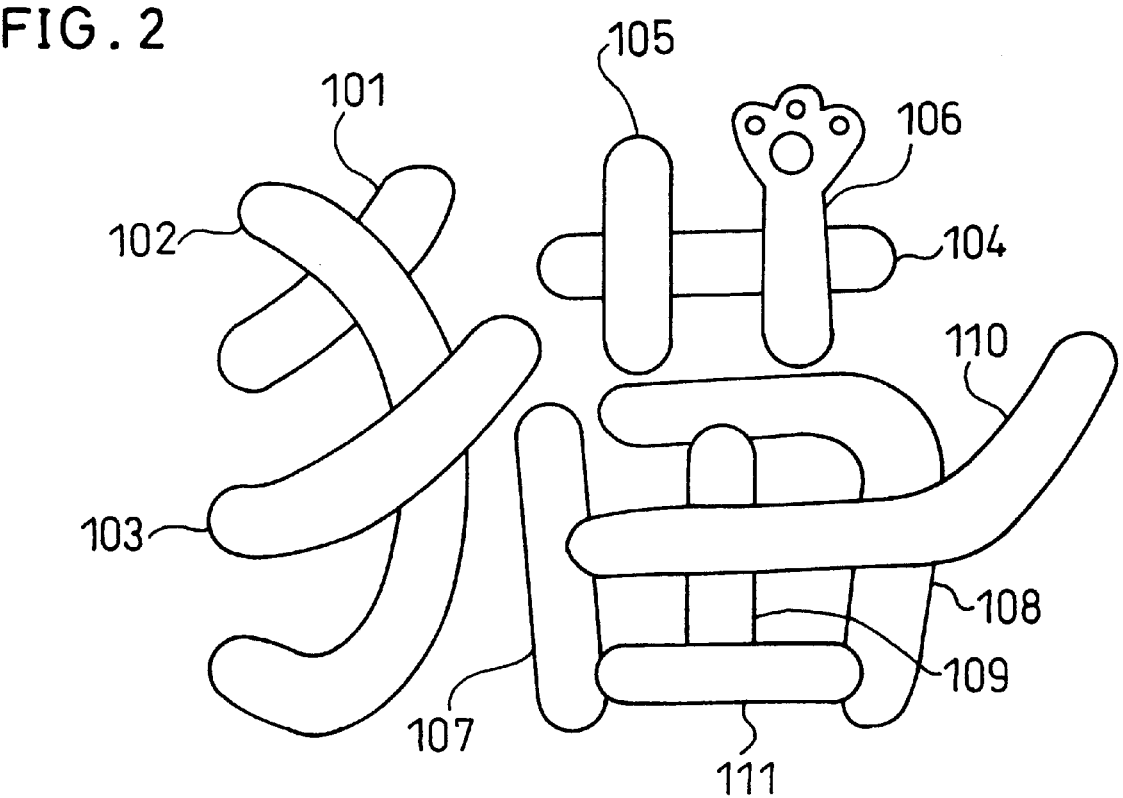
FIG. 2 is an explanatory view showing an example of a graphic character to be displayed by the information processing device of FIG. 1.
Figure 3:
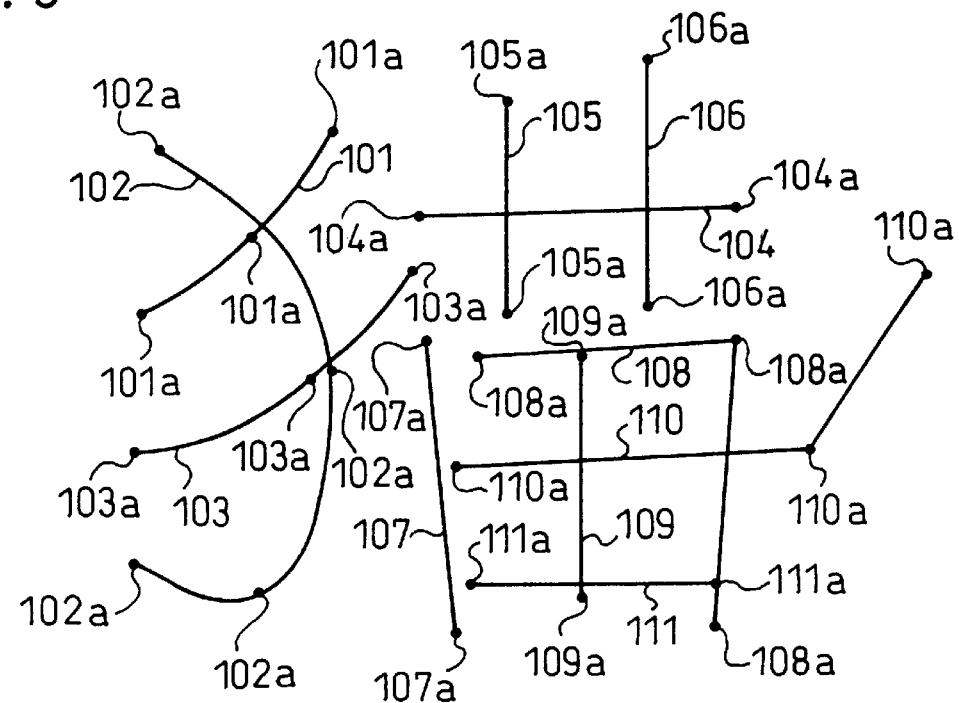
FIG. 3 is an explanatory view of a skeleton structure of the graphic character of FIG. 2.

Generally, the Chinese Character for "Cat" is displayed in a line drawing as shown in FIG. 3. As described, a character shown by an arrangement of lines (hereinafter each line referred to as a skeleton) is defined to be a skeleton character in this specification. In contrast, the graphic character is obtained by giving body to each skeleton of the skeleton character. The graphic character of the Chinese Character for "Cat" is, for example, as shown in FIG. 2.

The total number of strokes of the Chinese Character for "Cat" is "11", and the character code called a dot code of this Chinese character is "3913" according to JIS (Japanese Industrial Standard). In the present embodiment, the total number of strokes indicate a number of skeletons, and the dot code indicates the character code.

Namely, as shown in FIG. 3, the Chinese Character for "Cat" is constituted by eleven skeletons of elements 101 through 111. A skeleton for each element is obtained by connecting a plurality of skeleton points in a line. For example, the element 101 for the first stroke is obtained by connecting two skeleton points 101a. The element 102 for the second stroke is obtained by connecting four skeleton points 102a. Similarly, other elements 103 through 111 are obtained respectively by connecting a plurality of skeleton points 103a through a plurality of skeleton points IIIa respectively.

Figure 4A:
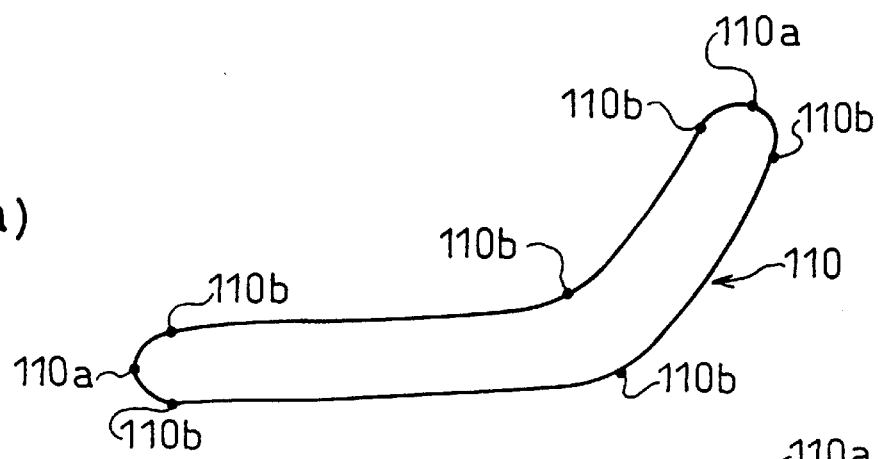
FIG. 4(a) is an explanatory view showing an outline of one element of the graphic character of FIG. 2.
Figure 4B:
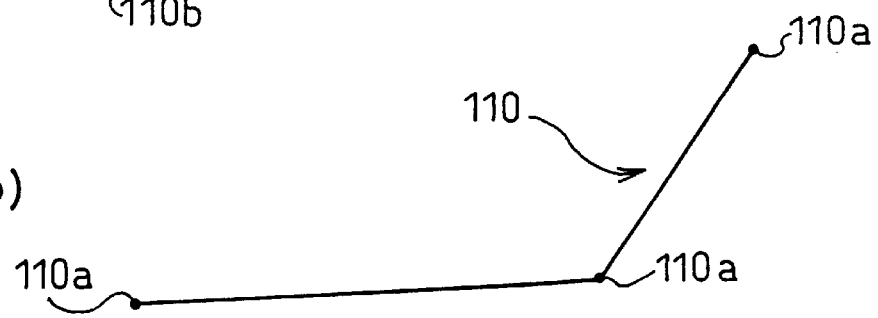
FIG. 4(b) is an explanatory view showing a skeleton structure of the element shown in FIG. 4(a)

As shown in FIG. 2, the Chinese Character for "Cat" in the graphic character is obtained by giving body to the skeleton character as described above. In this case, for example, with respect to the element 110 for the tenth stroke, the respective skeleton points 110a shown in FIG. 4(b) are connected and a body is given to the resulting connected line, and the outline shown in FIG. 4(a) is obtained. The way of giving body to the skeleton structure differs for each font type. Therefore, each graphic character has different outline data such as coordinates of the outline points, etc.

In FIG. 4(a), the outline of the element 110 is constituted by the two skeleton points 110a positioned at both ends of the element 110 and six outline points 110b which are connected in a line. Here, the skeleton points included in the outline when giving body to the skeleton are considered to be the outline points. Namely, in the example of FIG. 4(a), the number of outline points is not 6 but 8 including two skeleton points.

Next, graphic character data memory section 4, the transfer data memory section 5, the deformation data memory section 6, the transfer time data memory section 7 and the reproducing time data memory section 8 shown in FIG. 1 will be explained. These sections constitute a data memory section of the information processing device.

The graphic character data memory section 4 is provided for storing unrewritable data, i.e., graphic character data including data of skeleton points (graphic character skeleton data) when considering the graphic character as skeleton character and data of outline points of the elements (element outline data) which constitute the graphic character. The graphic character data memory section 4 is composed of the graphic character skeleton data memory area 4a for storing the graphic character skeleton data and the element outline data memory area 4b for storing the element outline data of the graphic character.

In the graphic character skeleton data memory area 4a, the data regarding respective skeleton points when showing the graphic character in the skeleton character, specifically, the stroke order code defining the stroke order of the graphic character, the number of skeletons contained in the element, the skeleton point code defining the skeleton point, and the coordinate data (position indicative data) of the skeleton point, and the structural element code defining the element corresponding to the element outline data, in relation to the character code of the graphic character are stored.

Namely, in the graphic character skeleton data memory area 4a, for the graphic character skeleton data, the number of skeletons and the element code corresponding to the stroke order of the graphic character are stored for each stroke order code. In the graphic character skeleton data memory area 4a, the skeleton point code, corresponding to the skeleton point and the coordinate data corresponding to the skeleton point code are also stored.

The graphic character skeleton data as stored in the graphic character skeleton data memory area 4*a* are supplied to the CPU 3 by the graphic character search section 9, for example, when displaying the skeleton character on the display device.

In the case of performing a dynamic display of the Chinese Character for "Cat", as shown in FIG. 5, the data as stored in relation to the character code "3913" and the number of skeletons 11, i.e., the number of skeletons "3" and the element code "2000" of the stroke order code (1) and the coordinate data of the skeleton codes k101 through k103, etc., are supplied to the CPU 3 as the graphic character skeleton data. Here, the coordinate data are unique to each stroke order code.

On the other hand, the element outline data memory area 4*b* is provided for storing the outline data (hereinafter referred to as element outline data) of each element of the graphic character, i.e., the coordinate data of the outline point of the element corresponding to the element code as stored in the graphic character skeleton data memory area 4*a* corresponding to a font style. In the element outline data memory area 4*b*, if the font type differs, different data are to be stored even for the same character.

To be more specific, as shown in FIG. 6, in the element outline data memory area 4*b*, the number of outline points, the outline point code defining the outline point of each element, a pointer indicating an address of the outline point code and the coordinate data of the outline point, etc., are stored for each element code of the graphic character.

The element outline data as stored in the element outline data memory area 4*b* are supplied to the CPU 3 by the graphic character search section 9 (to be described later) as well as the described graphic character skeleton data.

In the case where the graphic character for the Chinese Character for "Cat" is adopted for the dynamic display, as shown in FIG. 6, the data as stored in relation to the font style code "2828" indicating the graphic character shown in FIG. 2, i.e., the number of outline points "8" of the element code "2000" and the pointer of the outline point code and the coordinate data of the outline point codes from R20001 to R20008, etc., are supplied to the CPU 3 as the element outline data. Each coordinate data are unique to the font style code.

The transfer data memory section 5 shown in FIG. 1 includes a transfer type data memory area 5*a* for storing the type of the transfer method of the element and a transferred position indicative data memory area 5*b* for storing the coordinate data of the element as transferred. Here, the type of transfer method and the coordinate data may be unrewritable or rewritable.

The transfer type data memory area 5*a* is provided for storing the transfer type code for each stroke order code in relation to the character code, the number of skeletons of the character code and the transfer stroke order code for detecting the element subjected to the transfer of the graphic character, the transfer type code is stored for each stroke order code. Furthermore, in the transfer type data memory area 5*a*, the transfer type data (transfer method) corresponding to the transfer type code. Here, the transfer stroke order code indicates the stroke order code are also stored corresponding to the structural element of the graphic character subjected to the transfer. Here, the transfer type code defines the type of transfer for each element of the graphic drawing.

The transfer type data as stored in the transfer type data memory area 5*a* are supplied to the CPU 3 by the transfer data search section 10*a* of the element deformation data search section 10 (to be described later).

In the case where the graphic character to be dynamic displayed is the Chinese Character for "Cat", as an example of the transfer type data, as shown in FIG. 7, the transfer type codes corresponding to the stroke order codes (1) through (11) are stored in the transfer type data memory area 5*a* in relation to the character code for the Chinese Character for "Cat" "3913" and the number of skeletons "11".

For example, in the case where the graphic character to be processed is the Chinese Character for "Cat", and the elements 106 and 110 of this Chinese character are to be transferred, stroke order codes (6) and (10) corresponding to the stroke orders of respective elements of the graphic character are stored, and the data in relation to the transfer stroke order codes (6) and (10), i.e., the transfer type code "D" as stored corresponding to the stroke order code (10) are supplied to the CPU 3. Here, the transfer stroke order code to be stored in the transfer type data memory area 5*a* may be unrewritable or rewritable.

Here, the transfer code "A" indicates a parallel transfer, the transfer type code "B" indicates an inverse transfer, the transfer type code "C" indicates a rotation transfer, the transfer code "D" indicates a skeleton transfer, and the transfer code "E" indicates an outline deformation. Therefore, in this example, the outline of the element 101 of the stroke order code (6) is deformed, and the element 110 of the stroke order code (10) is subjected to the skeleton transfer. The detailed processes for the transfer type codes "A" through "E" will be explained later in reference to FIG. 21.

On the other hand, the transferred position indicative data memory area 5*b* is provided for storing the coordinate of each skeleton point of the graphic character as transferred in relation to the character code of the graphic character, the number of skeletons of the character code, the transfer stroke order code for detecting the skeleton points to be transferred, and the transfer stroke point code for detecting the skeleton points to be transferred.

The transferred position indicative data as stored in the transferred position indicative data memory area 5*b* are supplied to the CPU 3 by the skeleton deformation data search section 10*b* of the element deformation data search section 10 (to be described later).

In the case where a dynamic image of a graphic character of the Chinese Character for "Cat" is displayed, as shown in FIG. 8, the data stored in relation to the character code "3913" and the number of skeletons "11", i.e., the number of skeleton points corresponding to the stroke order codes (1) through (11), and the coordinate data of the respective skeleton points as transferred are stored in the transferred position indicative data memory area 5*b*. The coordinate data of skeleton points as transferred are defined based on the relationship between the stroke order codes (1) through (11) and the transfer type codes "A" through "E" shown in FIG. 7.

For example, in the case where the graphic character to be processed is the Chinese Character for "Cat", and the element 110 is to be moved, for the transferred position indicative data, among the coordinate data of the skeleton points as transferred corresponding to the stroke order code shown in FIG. 8, the data in relation to the transfer order code (10) and the skeleton point code k1003 to be moved of the element structure 100 are supplied to the CPU 3.

The deformation data memory section 6 as shown in FIG. 1 is the memory means for deforming the shape of the element of the graphic character. Specifically, the deformation data memory section 6 stores the deformation data for each font style. Namely, the deformation data memory section 6 stores the coordinate data of the outline points after the deformation, which have been stored as the outline data of the elements corresponding to the element codes in relation to the font style code indicative of the font style, the number of elements (number of skeletons) of the graphic character and the element code.

The deformation data to be stored in the deformation data memory section 6 are supplied to the CPU 3 by the deformation data search section 10c of the element deformation data search section 10. The deformation data may be unrewritable or rewritable.

In the case of performing a dynamic display of a graphic character of the Chinese Character for "Cat", as shown in FIG. 9, as the deformation data, the number of outline points and the deformation code are stored in the deformation data memory section 6 in relation to the font style code "2828" of the Chinese Character for "Cat".

The deformation code includes "a" and "b", and the deformation code "a" suggests the difference data (deformation difference data) of the element as deformed, and the deformation code "b" suggests the coordinate of each outline point of the element as deformed.

In the case of the transfer data shown in FIG. 9, the deformation code "a" is stored corresponding to the element codes "2000" and "3010", and the deformation code "b" is stored corresponding to the element code "8000". Namely, when deforming the graphic character of the Chinese Character for "Cat", the elements 101 and 106 corresponding to the element codes "2000" and "3010" as deformed are further deformed based on the deformation difference data, and the element 110 corresponding to the element code "8000" is deformed so that the outline point as deformed is positioned at a predetermined coordinate point.

The transfer time data memory section 7 shown in FIG. 1 is provided for storing a time interval (transfer time data) from when each element of the graphic character is displayed at a coordinate of a position before the deformation until when the element is displayed at a coordinate of a position after the transfer.

Specifically, in the transfer time memory section 7, the number of skeleton points of the stroke order code and the time interval corresponding to the skeleton point codes in relation to the character are stored code of the graphic character and the number of skeletons of the elements which constitute the graphic character.

Then, the transfer time data as stored in the transfer time data memory section 7 are supplied to the CPU 3 by the transfer time search section 11 (to be described later). Here, the transfer time data may be unrewritable or rewritable.

In the case of performing a dynamic display of a graphic character of the Chinese Character for "Cat", as shown in FIG. 10, the time interval T101'–T101 of the skeleton point code k101 which represents the skeleton point codes k101 through k103 is stored in relation to the character code "3913" in the transfer time data memory section 7. The time intervals for other stroke order codes are stored in the transfer time data memory section 7. The time interval T101'–T101 suggests the time required for transferring each skeleton point 101a as deformed. Therefore, other skeleton points in the skeleton of the same stroke order code are moved in the same time. As a result, the skeleton points subjected to the deformation can be moved with a small amount of data.

The reproducing time data memory section 8 shown in FIG. 1 is provided for storing the time interval (reproducing time data) from when each element of the graphic character is displayed at the transferred coordinate position to when the element as transferred is moved back to be displayed at the original coordinate position.

Specifically, in the reproducing time memory section 8, the number of skeleton points of the stroke order and the time interval corresponding to the skeleton point codes are stored in relation to the character code of the graphic character, and the number of skeletons of the elements of the graphic character.

The reproducing time data as stored in the reproducing time data memory section 8 are stored in the CPU 3 by the reproducing time search section 12 (to be described later). The reproducing time data may be unrewritable or rewritable.

For example, in the case of performing a dynamic image of a graphic character of the Chinese Character for "Cat", as shown in FIG. 11, for the reproducing time data, the time interval T101'–T101" of the skeleton point code k101 which represents the skeleton point codes k101 through k103 corresponding to the stroke order code (1) is stored in relation to the character code "3913" in the reproducing time data memory section 8. The time interval of other stroke order code is also stored in the reproducing time data memory section 8. Here, the time intervals T101"–T101' suggests a time required for each skeleton point to be moved for the deformation. Therefore, other skeleton points contained in the skeleton of the same stroke order code such as the skeleton point codes k102 and k103 are moved at the same time. As a result, the skeleton point can be moved with a small amount of data.

Next, the graphic character search section 9, the element deformation data search section 10, the transfer time search section 11, the reproducing time search section 12 and the element deforming section 13 which constitute the data processing section (transfer-deformation processing means) of the information processing device will be described. Here, the transfer-deformation processing means transfer-deforms at least one of divided plurality of elements which constitute the graphic character.

The graphic character search section 9 is data search means for searching the graphic character data for pattern displaying the graphic character corresponding to the character code, size, font style, etc., as input from the input section 1 as searched from the character forming data memory section 4 to be stored in the work memory of the CPU 3.

The graphic character search section 9 is constituted by a program generally used for computers, and an executing section of the program. The graphic character search section 9 is arranged such that when inputting the graphic character data into the input section 1, the graphic character data as input are stored in the program memory of the CPU 3, and the graphic character data as desired are read out from the graphic character data memory section 4. Specifically, the graphic character skeleton data as stored in the graphic character skeleton data memory area 4a and the element outline data as stored in the element outline data memory area 4b are read by the graphic character search section 9.

The element deformation data search section 10 is the data search means for searching the element deformation data for transfer-deforming each element of the graphic character as input from the input section 1 as searched from the transfer data memory section 5 and the deformation data memory section 6 to be stored in the work memory of the CPU 3.

The element deformation data search section 10 is constituted by the transfer data search section 10a, the skeleton deformation data search section 10b and the deformation data search section 10c.

The transfer data search section 10a is provided for searching the transfer method of the element of the graphic character to be dynamic displayed from the transfer type data memory area 5a of the transfer data memory section 5. Specifically, the transfer data search section 10a is constituted by the data search program and the executing section of the same.

The skeleton deformation data search section 10b is provided for searching the transferred coordinate of the skeleton point of each element of the graphic character from the transferred position indicative data memory area 5b of the transfer data memory section 5. Specifically, the transfer data search section 10b is constituted by the data search program and the executing section of the same.

The deformation data search section 10c is provided for searching the coordinate value of the outline point of each element of the graphic character from the deformation data memory section 6. Specifically, the transfer data search section 10c is constituted by the data search program and the executing section of the same.

The data search program of each of the described search sections is provided for searching data of various types regarding the graphic character to be processed as being supplied to the CPU 3 upon completing the search by the graphic character search section 9.

The transfer time search section 11 is provided for storing the time required from when each element of the graphic character is displayed at a predetermined position to the element as transferred is displayed from the transfer time data memory section 7 to be stored in the work memory of the CPU 3.

Generally, the transfer time search section 11 is constituted by the data search program and the executing section of the same, and after the deformation data of the graphic character to be processed are supplied to the CPU 3, the transfer time data as desired is read out from the transfer time data memory section 7 to be stored in the work memory of the CPU 3.

The reproducing time search section 12 is provided for searching the reproducing time which determines an operation speed of the element data to be repetitively output from the reproducing time data memory section 8 to be stored in the work memory of the CPU 3.

Generally, the reproducing time search section 12 is constituted by the data search program and the executing section of the same, and after the deformation data of the graphic character to be processed are supplied to the CPU 3, the transfer time data as desired are read out from reproducing time data memory section 8 to be stored in the work memory of the CPU 3.

The element deforming section 13 includes a transfer section 13a, a skeleton deforming section 13b and a deforming section 13c which serve as data processing means for transfer-deforming the elements of the graphic character. These sections 13a through 13c are constituted by the below-described deformation processing program and the executing section.

The transferring section 13a is constituted by the processing program for transferring the element based on the transfer data of the graphic character as searched from the transfer data memory section 5 by the transfer data search section 10a of the element deformation data search section 10, and the executing section of the described program.

The skeleton deforming section 13b is constituted by a processing program for transferring the outline point based on the transfer data as searched when the content of the transfer type as searched is the skeleton transfer, and the executing section of the described program.

The deforming section 13c is constituted by a processing program for transferring the outline points based on the transfer data as searched when the content of the transfer type as searched is the outline deformation, and the executing section of the same.

Each of the described processing programs are supplied to the CPU 3 in order upon completing the search by the element deformation search section 10, and executes the transfer-deformation process with respect to the graphic character to be processed.

Lastly, the output buffer 14, the reproducing section 15 and the output section 16 which constitute the data output section (output means) of the information processing device will be explained. The output buffer 14, the reproducing section 15 and the output section 16 alternately switch and output the display data of the element after being transfer-deformed by the transfer deformation processing means and the display data of the element before being transfer-deformed by the transfer deformation processing means.

The output buffer 14 is arranged so as to store data such as data having gone through the transfer-deforming process of the graphic character within the work memory of the CPU 3. The output buffer 14 is provided for temporarily storing the data as a result of the processing of the CPU 3.

The reproducing section 15 is provided for storing the data as processed and stored in the output buffer 14 in order to be transferred to the output section 16 in time series.

The output section 16 is provided for outputting the data as transferred from the reproducing section 15. For the display device of the output section 16, a liquid crystal display panel, etc, which constitutes the described input content display device 1a is used.

In the information processing device having the described arrangement, a dynamic display of the graphic character to be set beforehand will be explained with reference to FIG. 12 through FIG. 15. Additionally, the explanations will be given through the case of adopting the Chinese Character for "Cat" as the graphic character to be processed, through an example of processing an element corresponding to the tail of the Cat.

Figure 12:
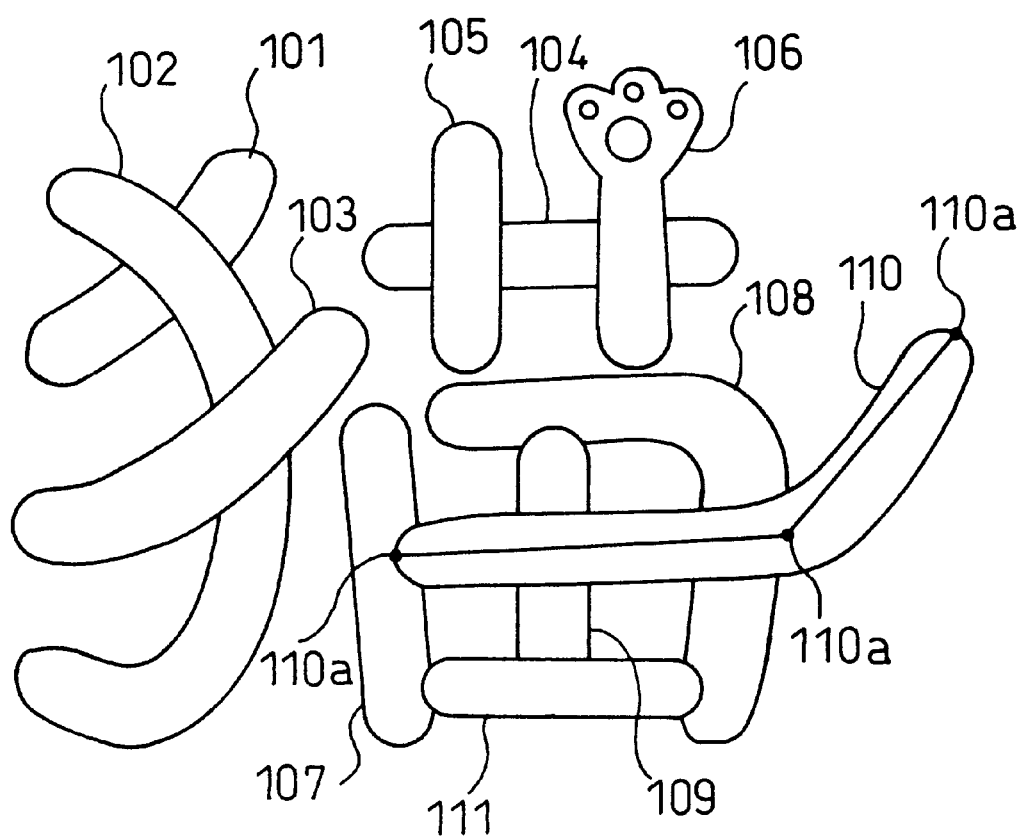
FIG. 12 is an explanatory view showing one example of the graphic character to be transfer-deformed by the information processing device of FIG. 1.
Figure 13:
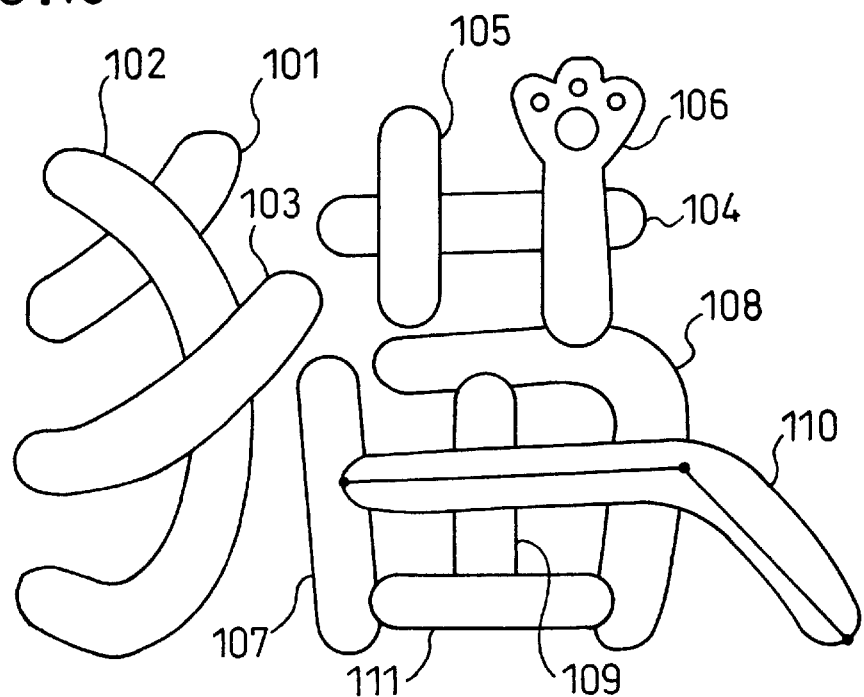
FIG. 13 is an explanatory view showing one example of the graphic character to be transfer-deformed by the information processing device of FIG. 1.

For example, as shown in FIG. 12, the element 110 of the graphic character "Cat" is used for the tail of the cat. First, as an example of the skeleton transfer, among three skeleton points 110a of the element 110, the outermost skeleton point 110a is held at a position closer to the element 104 than the other skeleton points 110a. Then, the outermost skeleton point 110a is moved to the position closer to the element 104 than the other two skeleton points 110a. By repetitively carrying out the described process, the element 110 can be moved as if the tail of the cat (graphic character) is moved up and down. As a result, an attractive dynamic image can be obtained.

Figure 14:
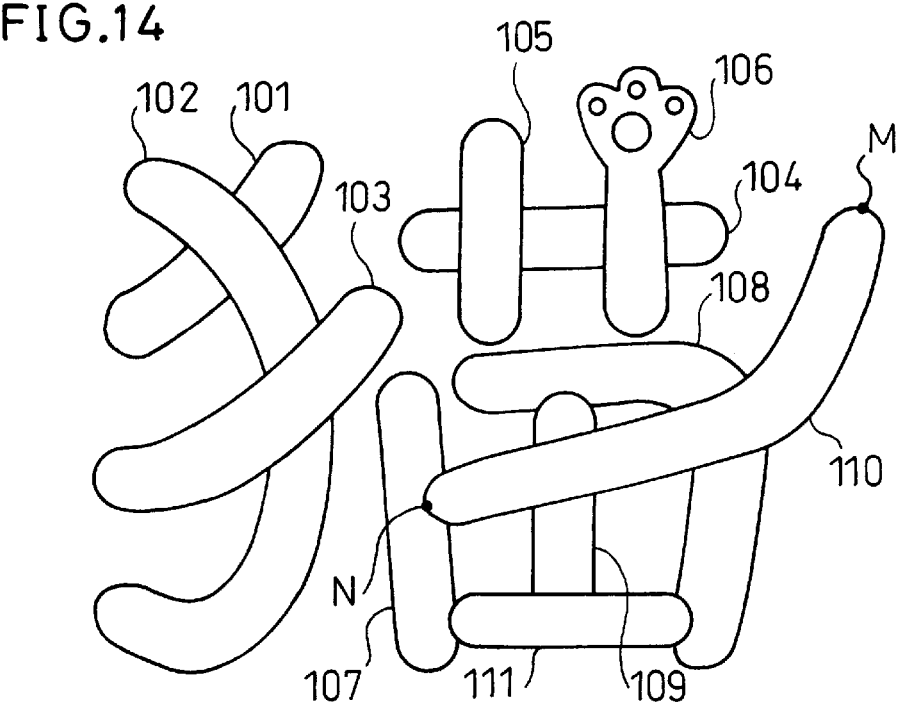
FIG. 14 is an explanatory view showing one example of the graphic character to be transfer-deformed by the information processing device of FIG. 1.

Additionally, in the case of applying the rotation transfer to the element 110 corresponding to the tail of a cat in the graphic character shown in FIG. 12, for example, as shown in FIG. 14, by transferring the outermost skeleton point 110a (point "N" in the figure) on the concentric circle about the skeleton point 110a (Point "M" in the Figure) positioned on the side of the element 107 than the element 110, the element 110 is looked as if a rotating tail of the cat (graphic character) is displayed.

Figure 15A:
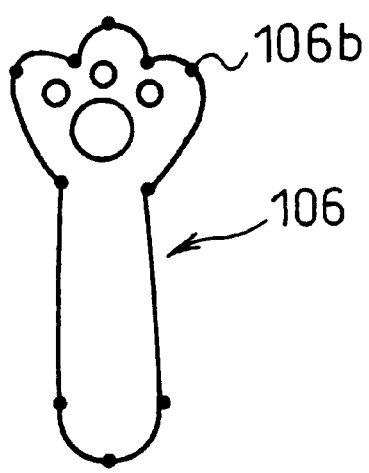
FIG. 15(a) and FIG. 15(b) are explanatory views showing one example of an element to be transfer-deformed by the information processing device of FIG. 1.
Figure 15B:
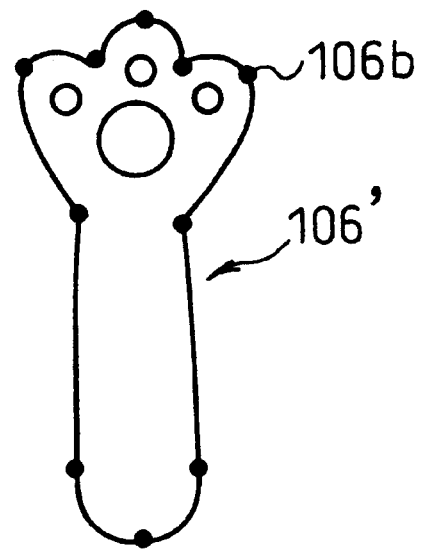

Furthermore, in the case of enlarging the element 106 which resembles the foot of the graphic character "cat" shown in FIG. 12, for example, as shown in FIG. 15, by transferring each respective outline point 106a of the element 106 by a predetermined width so as to maintain the outline after being deformed parallel to the outline before being deformed, the element 106' is obtained which appears as if the foot of the graphic character "Cat" is enlarged and then reduced to the original size.

In the above, explanations on the dynamic display of the graphic character of the information processing device have been given, and the following will explain the processes of the dynamic display. In the present embodiment, the Chinese Character for "Cat" is adopted for the graphic character to be dynamic-displayed.

Figure 16:
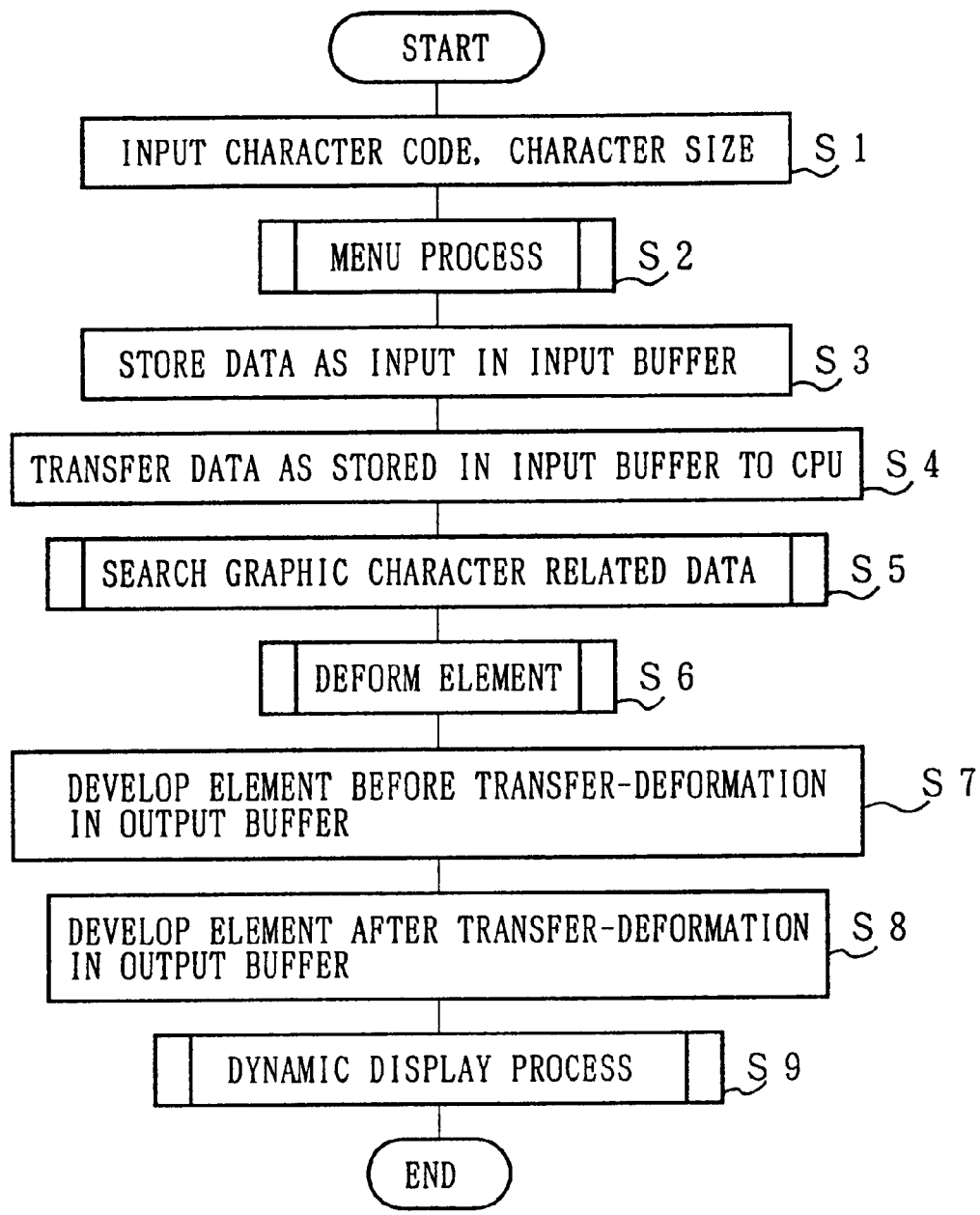
FIG. 16 is a flowchart showing a flow of processing information by the information processing device of FIG. 1.

First, as shown in FIG. 16, when starting the character generating process, the character code and the character size of the graphic character to be dynamic displayed are input by the user using the input device 1a (S1).

Then, upon inputting the character code and the character size, a menu process for the dynamic display is performed so as to specify which element is to be transferred (deformed) (S2). The menu process will be described in detail later.

Next, when menu processing in S2, the data as input is stored in the input buffer 2 (S3). Here, the data regarding the dynamic display are also stored in the input buffer 2.

Next, the data as stored in the input buffer 2 are transferred to the CPU 3 (S4). Here, the data are stored in the work memory of the CPU 3, and the data are used when necessary for controlling the entire process until generating the graphic character corresponding to the character code as input.

Thereafter, the CPU 3 performs the graphic character related data search operation (S5). Namely, the CPU 3 performs the data related to the graphic character corresponding to the character code, the character size, etc., as input by the graphic character search section 9, the element deformation data search section 10, the transfer time search section 11, and the reproducing time search section 12 as searched from the graphic character data memory section 4, the transfer data memory section 5, the deformation data memory section 6, the transfer time data memory section 7 and the reproducing time data memory section 8. The graphic character related data search process will be described in detail later.

Thereafter, the deformation process is performed by the element deforming section 13 with respect to respective elements of the graphic character (S6). The deformation process will be described in detail.

After the deforming process of the element is performed, the element deforming section 13 transfers the element before the transfer is performed by the process of the stroke order code, and develops it (S7) Here, the reproducing time data of the stroke order code as stored in the work memory of the CPU 3 are transferred to the output buffer 14. For example, in the case where the stroke order code of the graphic character data as read in S5 are (10) and (6), the reproducing time data T1001"–T1001' and the reproducing time data T601"–T601' are transferred.

The element deforming section 13 transfers the element having gone through the transfer-deforming process corresponding to the stroke order code and is developed (S8). Here, the transfer time data of the stroke order code as stored in the work memory of the CPU 3 are transferred to the output buffer 14. For example, the stroke order code of the graphic character data as read in S5 are (10) and (6), the transfer time data T10001'–T1001 of the stroke order code (10) and the transfer time data T601'–T601 of the stroke order code(6) are transferred.

Lastly, the data as stored in the output buffer 14 are transferred to the reproducing unit 15, and the dynamic display process of the graphic character is performed (S9). The dynamic display process will be described in detail later.

The menu process in S2 of the flowchart shown in FIG. 16 will be explained with reference to FIG. 17 and FIG. 18(a) through FIG. 18(c).

First, upon inputting by the input device 1a the character code and the character size of the graphic character to be dynamic displayed, the CPU 3 displays the menu processing screen in the input content display device 1b (S11). Additionally, as the Chinese Character for "Cat" is adopted for the graphic character to be dynamic displayed, the character code "3913" of the cat and the character size, for example, "56 bits" are input from the input device 1a.

Next, it is selected whether a dynamic display is to be performed (S12). If not in S12, the process for not selecting the easy setting is executed.

On the other hand, if the dynamic display is selected in S12, it is selected next if the dynamic display is to be performed based on the easy setting (S13). Here, if it is selected to process the dynamic display by the easy setting, the process in S3 is executed for the described dynamic display process. On the other hand, if it is selected that the dynamic display is performed without using the easy setting, the parameter input process to be explained in the embodiment to be described later is performed.

For the described display in the menu process, first, for example, the menu screen shown in FIG. 18(a) is displayed on the input content display device 1b. In this screen, a message "Dynamic Display?" and an answer to this message "YES" or "NO" are displayed on the input content display device 1b. If the dynamic display is selected, the portion to be displayed as "YES" is specified by a pointing device such as a mouse, a kind of the input device 1a. Specifically, in the case of adopting a mouse for the pointing device, the process as selected on the screen is executed by making a double click "YES".

In the menu process screen shown in FIG. 18(a), by specifying the portion displayed as "YES" on the display screen, the next screen appears as shown in FIG. 18(b) on which a message "Easy Setting?" is displayed on the input content display device 1b. Here, on the input content display device 1b, a message "Easy Setting?" as well as the answer to this message "YES", "NO" are displayed. Here, if the easy setting is selected, "YES" is selected by the pointing device such as a mouse, etc. If not, "NO" is selected by the pointing device such as a mouse, etc. By selecting either "YES" or "NO" displayed on the screen shown in FIG. 18(b), the input content display device 1b displays a message "Start Process" as shown in FIG. 18(c), and a sequential dynamic display process is performed.

Figure 19:
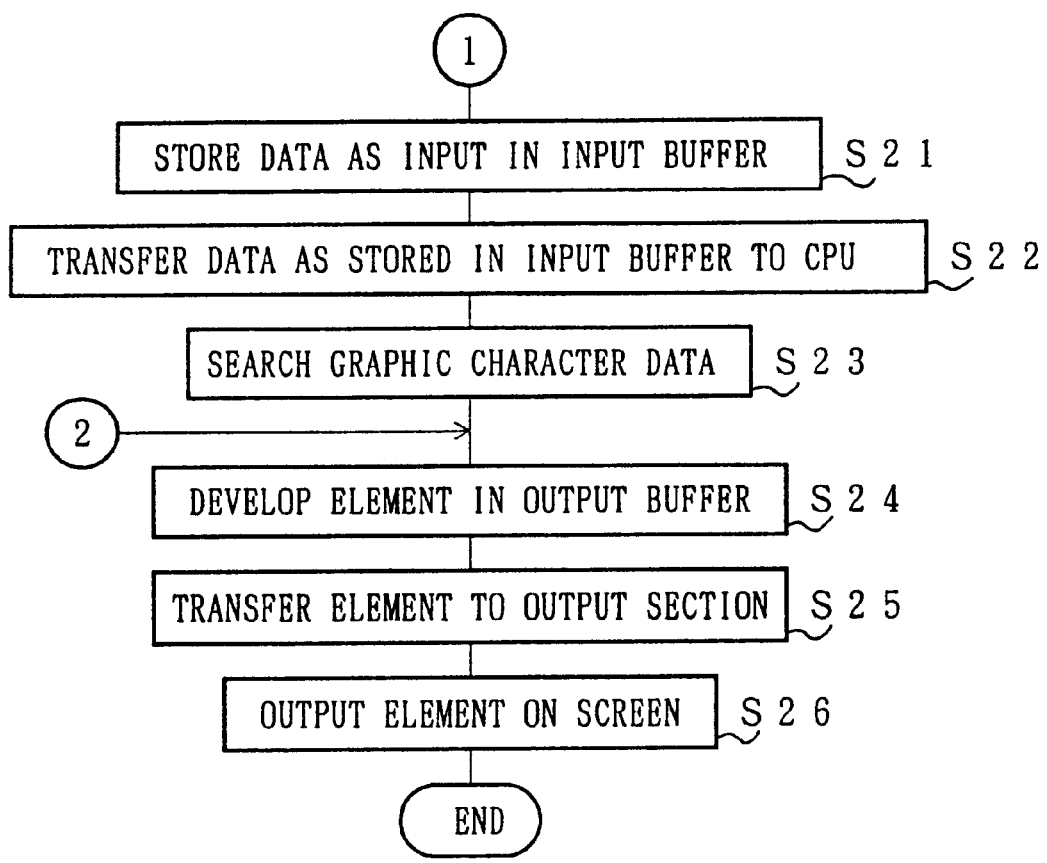
FIG. 19 is a flowchart showing a flow of processing data in the data processing device of FIG. 1.

The process of the case where the dynamic display is not selected in S12 will be explained with reference to the flowchart shown in FIG. 19.

First, the character code, the character size, font style, etc., as input in S1 of the flowchart shown FIG. 16 are stored in the input buffer 2 (S21).

Then, the data as stored in the input buffer 2 are transferred to the CPU 3 (S22). Here, the data as transferred are stored in the work memory of the CPU 3.

Next, the graphic character search section 9 searches the graphic character based on the data as stored in the work memory, i.e., character code, character size, font style, etc., (S23).

Thereafter, the data with regard to the element of the graphic character as searched are developed in the output buffer 14 (S24).

Then, the element of the graphic character as developed in the output buffer 14 is transferred to the output section 16 by the reproducing section 15 (S25), and the element as transferred is output onto the screen of the output section 16 (S26).

As described, in the case where the dynamic display is not performed, the graphic character can be output onto the screen of the output section 16 based on the character code, the character size, font style, etc., in the static state, i.e., non-active state.

Here, the explanations will be given through the case of selecting the easy setting.

Figure 20:
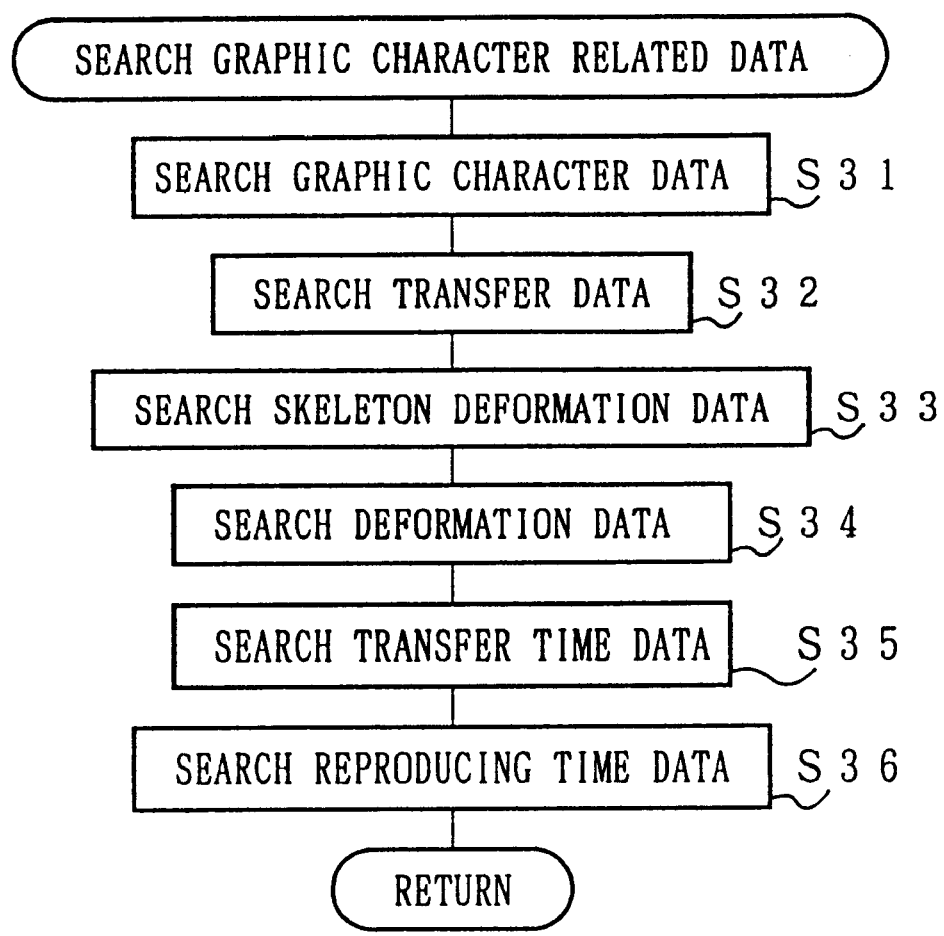
FIG. 20 is a flowchart showing a flow of processing data in the information processing device of FIG. 1.

First, the process of i) searching the graphic character related data based on the character code as input by the input device 1a by the graphic character search section 9, the element deformation data search section 10, the transfer time search section 11 and the reproducing time search section 12 from the graphic character data memory section 4, the transfer data memory section 5, the deformation data memory section 6, the transfer time data memory section 7 and the reproducing time data memory section 8 and ii) storing the data as searched with the work memory of the CPU 3 will be explained in reference to the flowchart of FIG. 20. Here, the explanations will be given through the case of adopting Chinese Character for "Cat" for the graphic character to be processed.

First, the graphic character data is searched (S31). Namely, by the graphic character search section 9, the graphic character of the Chinese Character for "Cat" having the character code "3913" as transferred to the CPU 3 from the input buffer 2 is searched from the graphic character data memory section 4.

The graphic character search section 9 searches the character code (see FIG. 5) as stored in the graphic character skeleton data memory area 4a of the graphic character data memory section 4. Upon searching the character code, the attached data of one character (graphic character data), the number of skeletons, the stroke order code for the number of skeletons, the number of skeletons, the element codes, the skeleton point code and the coordinate data of each skeleton point are extracted to be stored in the work memory of the CPU 3. Next, upon storing the graphic character data as extracted in the work memory of the CPU 3, the transfer data are searched (S32). Namely, by the transfer data search section 10a of the element deformation data search section 10, the data with regard to the transfer of the elements which constitute the graphic character are searched from the transfer data memory section 5.

The case of searching the graphic character data in S31, the transfer data search section 10a searches the character code (see FIG. 7) as stored in the transfer type data memory area 5a. As a result of search, if the transfer type data corresponding to the input character code "3913" is found, the transfer stroke order code attached to the transfer type data is searched.

For the transfer type data of the transfer stroke order code specifying the element to be transfer-deformed of the character of the character code "3913", "stroke order code (6)" and "stroke order code (10)" are stored as shown in FIG. 7. Namely, the elements of the graphic character subjected to the dynamic display are the elements of the sixth and the tenth stroke orders. In the example of FIG. 7, the transfer type code of "stroke order code (6)" is, for example, "E", which is the code for transferring the outline of the element. The transfer type code of the stroke order code (10) is, for example, "D" which is the code for deforming the skeleton of the element.

Therefore, the transfer data search section 10a is provided for extracting the data of "stroke order code (6)" and "transfer type code (E)", and "stroke order code (10)" and "transfer type code (D)" to be stored in the work memory of the CPU 3.

Then, after the transfer data are searched by the transfer data search section 10a, skeleton deforming data are searched (S33). Namely, the transferred position data (see FIG. 8) are searched from the transfer position indicative data memory area 5b by the skeleton deformation data search section 10b.

The skeleton deformation data search section 10b searches the transfer skeleton point code k1003 and the coordinate of the skeleton point as transferred which constitute the stroke order code (10) as the transfer position data corresponding to the stroke order code (10).

Next, after the transfer position data are searched by the skeleton deformation data search section 10b, the deformation data are searched (S34). Namely, by the deformation data search section 10c, the deformation data (see FIG. 9) as stored in the deformation data memory section 6 are searched.

The deformation data search section 10c searches the stroke order code and the element code of the graphic character corresponding the stroke order code as searched from the work memory.

For example, in the case of searching the transfer type code "E" by the deformation data search section 10c, the "stroke order code (6)" corresponding to the transfer type code "E" is searched from the graphic character skeleton code data of the character code "3913" as extracted from the work memory, and the element code corresponding to the "stroke order code (6)" is searched. As the element code corresponding to the stroke order code (6) of the character code "3913" is "8000", the deformation code of the element code "8000" is searched from the deformation data memory section 6. As the deformation code of the element code "8000" is "b", it can be seen that the transfer type as selected is to alter the coordinates of the outline points. Therefore, the deformation data search section 10c extracts the element code "8000", the deformation code "b", and the outline point coordinate data of the element code "8000" of the element as deformed are extracted to be stored in the work memory.

As described, by the search of the element deformation data search section 10, the transfer type code "E" and the element code "8000", the deformation code "b" and the coordinate of the element as deformed corresponding to the stroke order code (6) and the transfer type code "D", the transfer skeleton point code and the coordinate data after transferring the skeleton point are stored in the work memory.

Next, by the transfer time search section 11, the transfer time data as stored in the transfer time data memory section 7 are searched (S35). The transfer time search section 11 searches the transfer time data corresponding to the character code "3913".

For example, when the transfer time search section 11 searches the "stroke order code (6)" from the data (see FIG. 10) of the character code "3913" of the transfer time data as stored in the transfer time data memory section 7, the transfer time search section 11 reads out the transfer time T601'–T601 of the "stroke order code (6)" to be stored in the work memory. Similarly, the transfer time search section 11 extracts the transfer time T1001'–T1001 of the stroke order code (10) to be stored in the work memory.

Thereafter, by the reproducing time search section 12, the reproducing time data (see FIG. 11) are searched from the reproducing time data memory section 8 (S36). In this case, the reproducing time search section 12 searches the reproducing time data corresponding to the character code "3913".

For example, when the reproducing time search section 12 searches the data of the character code "3913" of the reproducing time data as stored in the reproducing time data memory section 8, the reproducing time T601"–T601' of the stroke order code (6) is extracted to be stored in the work memory. Similarly, the reproducing time T1001"–T1001' of the "stroke order code (10)" is extracted to be stored in the work memory.

In the described processes S31 through S36, the graphic character data, the transfer data, the skeleton deformation data, the deformation data, the transfer time data and the reproducing time data as read by each search section are stored in the work memory of the CPU 3. Then, using the described data, the transfer-deforming process of the graphic character is performed.

Figure 21:
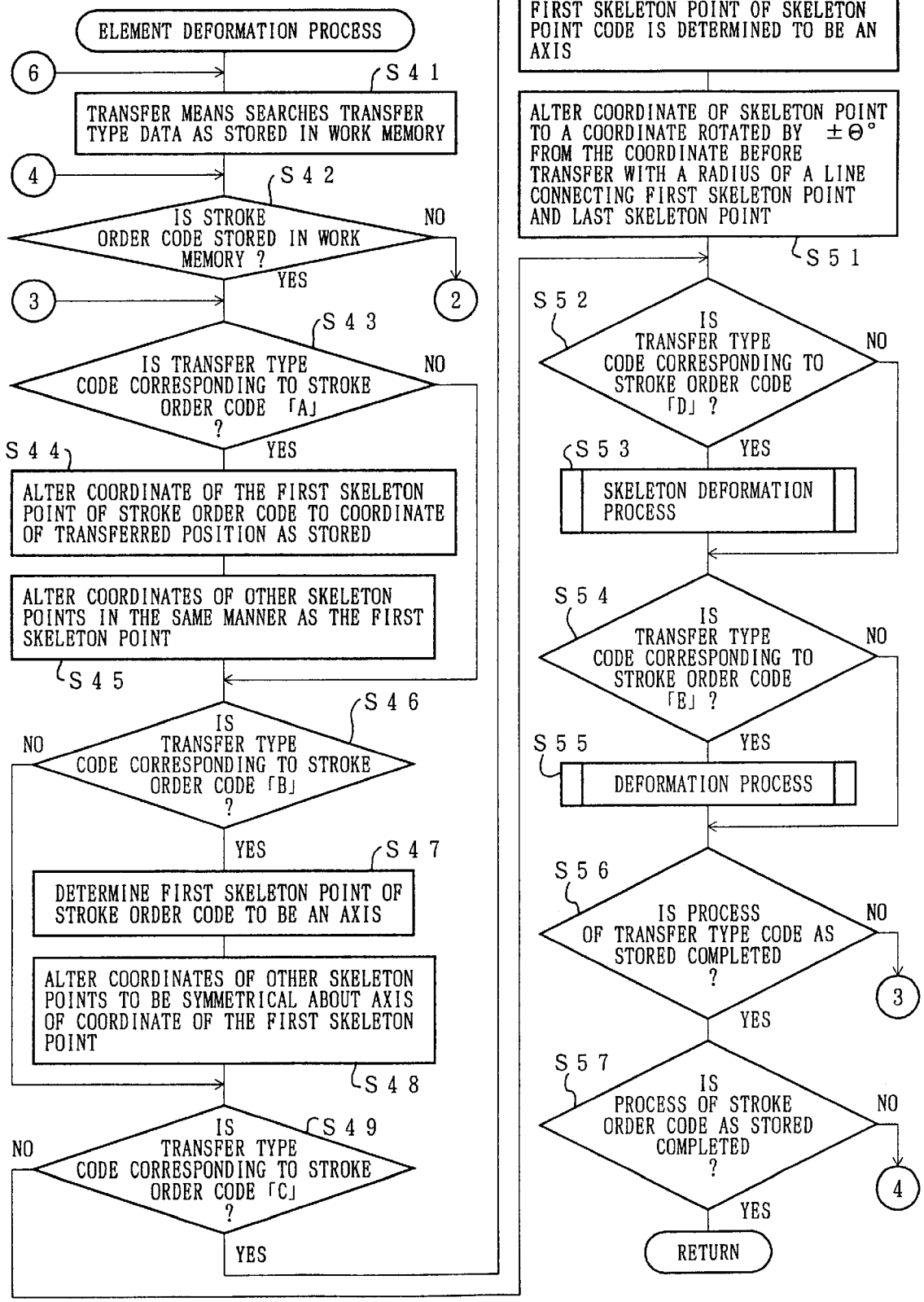
FIG. 21 is a flowchart showing a flow of processing data in the information processing device of FIG. 1.

The transfer-deforming process of the graphic character (the content of each transfer type shown with FIG. 7) will be explained in reference to the flowchart of FIG. 21. Here, explanations will be given through the case of deforming the elements of the graphic character as the deformation process of the graphic character.

First, the transfer type data as stored in the work memory are searched by the transfer section 13a of the element deforming section 13 (S41).

Next, it is determined if the stroke order code is stored in the work memory as a result of search by the transfer section 13a (S42). If the stroke order code is not stored in the work memory, it is determined that the transfer-deformation process is not desired, and the sequence goes to S24 shown in the flowchart of FIG. 19.

On the other hand, if the stroke order code is stored in the work memory in S42, it is determined if the transfer type code corresponding to the stroke order code is "A" (S43). If the transfer type code is not "A", the sequence goes to S46, and the transfer type code is further determined.

On the other hand, if it is determined that the transfer type code is "A" in S43, as the type of the transfer of the element is the parallel transfer, the parallel transfer is performed by the parallel transfer means of the transfer section 13a. Specifically, the coordinate of the first skeleton point is altered to the coordinate of the transferred position as stored in the work memory (S44). Then, the coordinate of other skeleton point of the stroke order code is altered in the same manner as the first skeleton point (S45). The coordinate after the transfer is read from the transferred position indicative data memory area 5b shown in FIG. 8.

In S45, assumed, for example, that the coordinates of the first skeleton point of the stroke order code before and after the transfer be q(r, s) and Q(R, S) respectively, then the respective coordinates of other skeleton points after the transfer in S45 can be obtained by adding (R-r, Q-q) to the respective x-coordinate values and y-coordinate values before the transfer.

Thereafter, it is determined if the transfer type code corresponding to the stroke order code is "B" (S46). If the transfer type code is not "B", the sequence goes to S49 where the transfer type code is further determined.

On the other hand, in S46, if it is determined that the transfer type code is "B", as the type of the transfer of the element is the inverse transfer, the inverse transfer is performed by the inverse transfer means of the transfer section 13a. Specifically, the first skeleton point of the stroke order code is determined to be a reference point (S47). Then, the coordinates of other skeleton points of the stroke order code are altered to be coordinate positions symmetrical about the reference point of the coordinate of the first skeleton point (S48).

Specifically, in S48, it is determined that the coordinate of the skeleton point of the smallest skeleton point code is determined to be v(w, z), and the inverse transfer is performed about the central axis of the vertical line extending from the skeleton point with respect to the x-axis. Alternately, the inverse transfer is performed about the central axis of the vertical line extending from the skeleton point v with respect to the y-axis.

For example, in the case of performing the inverse transfer with respect to the x-axis, the respective coordinates of the other skeleton point p than the skeleton point v before and after the transfer are p (x, y) and p'(w-(x-w), y).

On the other hand, in the case of performing the inverse transfer with respect to the y-axis, the respective coordinates of the skeleton point p other than the skeleton point v before and after the transfer are p(X, Y) and p'(X, z-(Y-z)).

The graphic character to be explained in the present embodiment is composed of the graphic character skeleton data and the element outline data, and to read out the graphic character indicates to read out the element outline data with respect to the graphic character skeleton data as stored in the graphic character skeleton data memory area 4a. Therefore, as the graphic character obtained by giving body to the skeleton structure is displayed, the element position is determined by the coordinate of the skeleton point.

Next, it is determined if the transfer type code corresponding to the stroke order code is "C" (S49). Here, if the transfer type code is not "C", the sequence goes to S53 where the transfer type code is further determined.

On the other hand, if it is determined in S49 that the transfer type code is "C", as the transfer type of the element is the rotation transfer, the rotation transfer is performed by the rotation transfer means of the transfer section 13a. Namely, the first skeleton point of the transfer code is determined to be the center of rotation by the rotation transfer means (S50) Then, the coordinate is transferred by rotating the original coordinate with a radius of a line extending from the first skeleton point of the stroke order code to the last skeleton point by ±θ° (S51).

Next, it is determined if the transfer type code corresponding to the stroke order code is "D" (S52). Here, if the transfer type code is not "D", the sequence moves to S64 where the transfer type code is further determined.

On the other hand, if it is determined that the transfer type code is "D" in S52, a sequence moves to the sub-routine of the skeleton deformation process of the element (S53). The described sub-routine of the skeleton deformation process will be described later.

Thereafter, it is determined if the transfer type code corresponding to the transfer code is "E" (S54). If the transfer type code is not "E", the sequence moves to S56 where the further determination of the transfer type code is performed.

If it is determined in S54 that the transfer type code is "E", a sequence goes to the sub-routine of the deformation process of the element (S55). This sub-routine of the deformation process will be described later.

Further, it is determined if the processing of the transfer type code as stored is completed (S56). If it is determined that the processing of the transfer type code is not completed, a sequence goes to S43 where the redetermination of the transfer type code is performed.

On the other hand, if it is determined in S56 that the processing of the transfer type code is completed, it is determined if the deformation process with respect to the stroke order code as stored is completed (S57). Here, if it is determined that the element deformation process has not been completed with respect to the stroke order code as stored, a sequence moves back to S42, and an element deformation process corresponding to other stroke order code as stored is performed. On the other hand, if it is determined that the element deformation process with respect to the stroke order code as stored is completed, the sequence moves back to S7 in the flowchart of FIG. 16.

Here, the skeleton deformation process in S53 and the deformation process in S55 will be explained with reference to the flowcharts shown in FIG. 22 and FIG. 23.

First, the skeleton deformation process will be explained.

Figure 22:
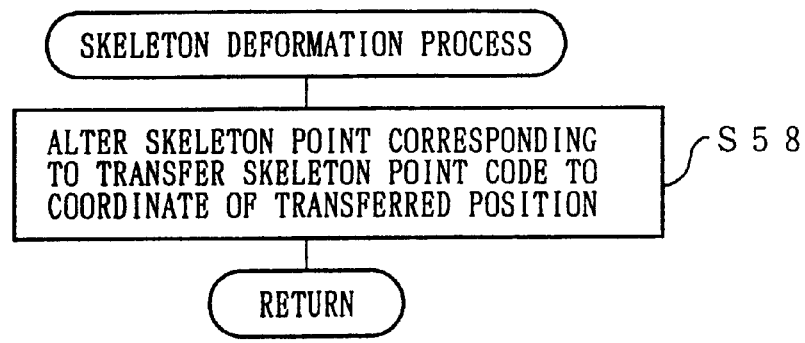
FIG. 22 is a flowchart showing a flow of processing data in the information processing device of FIG. 1.

As shown in the flowchart of FIG. 22, if it is determined that the transfer type code is "D" in S52, the skeleton point corresponding to the transfer skeleton point code as stored in the work memory is altered to the transferred coordinate data (S58). In this case, as the transferred skeleton point code is k1003, the skeleton point of k1003 is altered. Therefore, by replacing the coordinate of k1003 before the transfer with the coordinate after the transfer, the skeleton transfer process is completed, and a sequence goes to S54 in the flowchart of FIG. 21.

Next, the deformation process will be explained.

Figure 23:
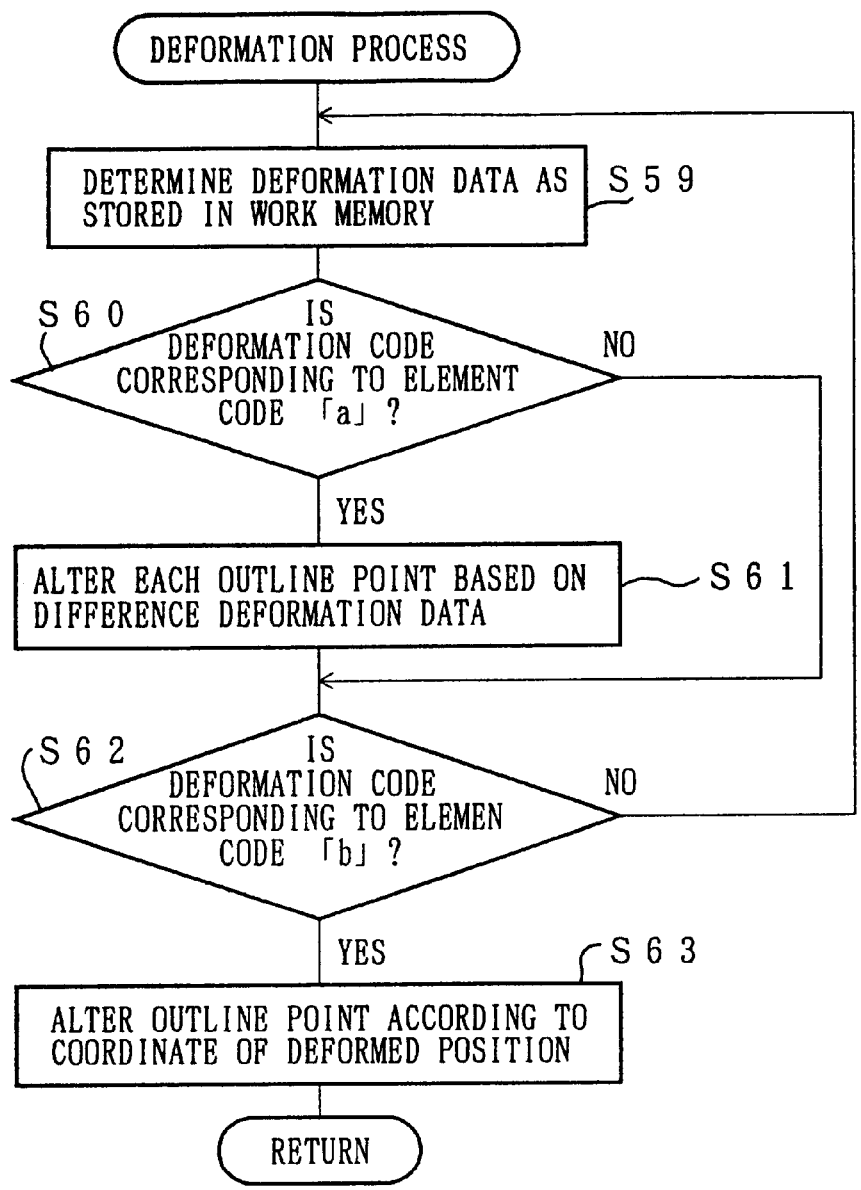
FIG. 23 is a flowchart showing a flow of processing data in the information processing device of FIG. 1.

First, as shown in the flowchart of FIG. 23, if it is determined that the transfer type code is "E" in S54, the deforming section 13c determines the deformation data as stored in the work memory (S59). For the work memory, the element code "8000", the deformation code "b", and the coordinate of the element after the transfer are stored.

Next, it is determined if the deformation code corresponding to the element code is "a" (S60). If it is determined that the deformation code is not "a", the sequence goes to S62 where a further determination of the deformation code is performed. As the element code of the stroke order code (6) of the character code "3913" is "8000", the deformation code is "b".

Therefore, in S60, if the deformation code is not "a", the coordinate code is determined to be "b". On the other hand, if the determination code is determined to be "a" in S60, based on the difference deformation data as stored in the work memory as extracted from the deformation data memory section 6, the coordinate after the transfer is computed, and the coordinate of each outline point is altered (S61).

For example, assuming that the distance of the line extending from the line connecting the skeleton points to the outline point is J, the difference deformation data is J±α. By the difference deformation data J±α, the coordinate after the transfer is computed, and the coordinate of each outline point of the element is altered.

Thereafter, it is determined if the deformation code corresponding to the element code is not "b" (S62). If it is determined that the deformation code is "b", a sequence goes to S59 where a further determination of the deformation code is performed. As the element code of the "stroke order code (6)" of the character code "3913" is "8000", the deformation code is "b".

In S62, if it is determined that the deformation code is "b", the outline point is altered according to the coordinate after the transfer as stored in the work memory (SG3). Here, by replacing the coordinate of the outline point of the element code "8000" before the transfer with the coordinate of the outline point after the transfer, the deformation process is completed, and a sequence goes to S56.

Figure 24:
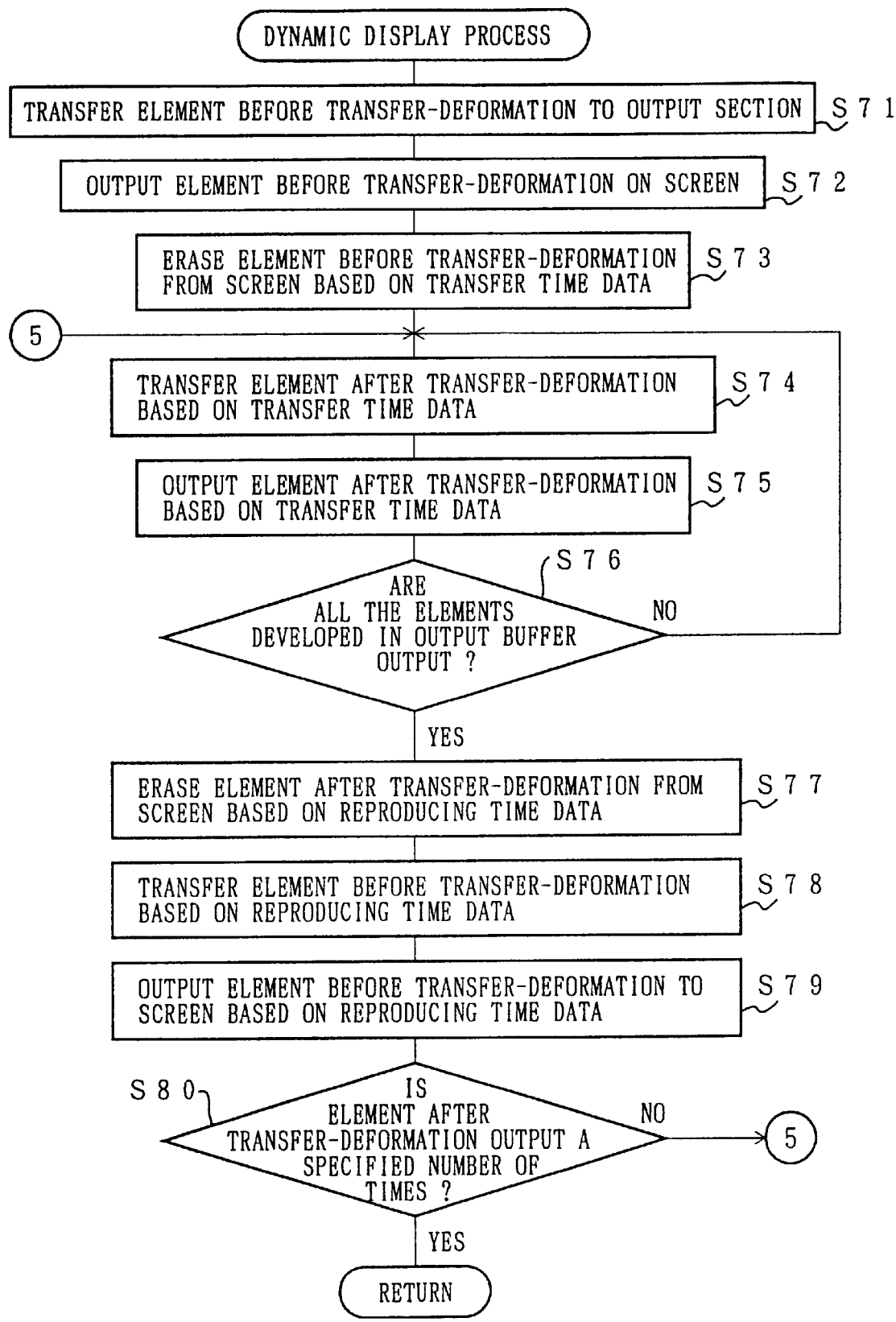
FIG. 24 is a flowchart showing a flow of processing data in the information processing device of FIG. 1.

The process of deforming the graphic character, i.e., the dynamic display process will be explained in reference to the flowchart shown with FIG. 24 based on the graphic character data as stored in the work memory of the CPU 3.

First, the element before the transfer-deformation as stored in the work memory is transferred to the output section 16(S71) by the reproducing section 15 in time series. It this state, the graphic character data of the Chinese Character for "Cat" is completed by the described elements.

Next, the element as transferred to the output section 16 is output to the screen of the display device of the output section 16 (S72). The element as transferred is output onto the screen by the output section 16. In this state, from the element as output, the graphic character of the Chinese Character for "Cat" before the transfer-deformation is displayed on the screen as shown in FIG. 2.

Next, the element before the transfer-deformation is erased from the screen (S73). Based on the transfer time data T601–T601 of the stroke order code (6), the element before the transfer-deformation corresponding to the stroke order code (6) is erased from the screen.

Thereafter, the element after being transfer-deformed as stored in the work memory is transferred to the output section 16 based on the transfer time data (S74). The element after being transfer-deformed is transferred to the output section 16 by the reproducing section 15.

Next, the element as transferred to the output section 16 is output onto the screen of the display device of the output section 16 based on the transfer time data (S75). Based on the transfer time data T601'–T601 of the stroke order code (6), the element after the transfer-deformation corresponding to the stroke order code (6) is output to the screen.

Then, it is determined if all the elements as developed in the output buffer 14 have been output (S76). If all the elements have not been output, a sequence goes to S74 where the elements remaining in the output buffer 14 are output.

On the other hand, if all the elements as developed in the output buffer 14 have been output in S76, the elements after the transfer-deformation are erased from the screen based on the reproducing time data (S77), which are T601"–T601' corresponding to the stroke order code (6).

Similarly, as to other elements of the graphic character to which the transfer-deformation process is applied, the element of the transfer-deformation is displayed on the screen, and then erased from the screen. For example, an explanation will be given through the case of adopting the stroke order code (10) as other element. The described process is performed based on the transfer time data T1001'–T1001 and the reproducing time data T1001"–T1001'.

Thereafter, based on the reproducing time data, the element before the transfer-deformation is transferred to the output section 16 (S78). The reproducing section 15 transfers the element corresponding to the stroke order code (6) before the deformation to the output section 16 based on the reproducing time data T601"–T601'.

Then, based on the reproducing time data, the element before the transfer-deformation is output onto the screen of the output section 16 (S78). The output section 16 outputs the element corresponding to the stroke order code (6) before the deformation onto the screen based on the reproducing time data T601"–T601'.

Similarly, the stroke order code (10) is also output onto the screen based on the reproducing time data T1001"–T1001'. As described, the output section 16 switches the output of the element before and after the deformation based on the transfer time data as stored in the transfer time data memory section 7 and the reproducing time data as stored in the reproducing time data memory section 8.

Lastly, it is determined if the element after the transfer-deformation has been output a set number of times (S80). If it is determined that the processed element has not been output the set number of times, a sequence moves back to S74. On the other hand, if it is determined that the processed element has been output the set number of times, the process is ended.

For the described dynamic display process explained in the above step, the element before and after the transfer-deformation process are output alternately such as the stroke order code (6) and the stroke order code (10) before the transfer-deformation, the stroke order code (6) and the stroke order code (10) after the transfer-deformation, the stroke order code (6) and the stroke order code (10) before the transfer-deformation as so on. The order of outputting on the screen is not limited to the above, and the order may be varied depending on the transfer time data and the reproducing time data.

The information processing device of the described arrangement permits the transfer-deformation process to be performed for each element of the graphic character with ease.

Figure 25A:
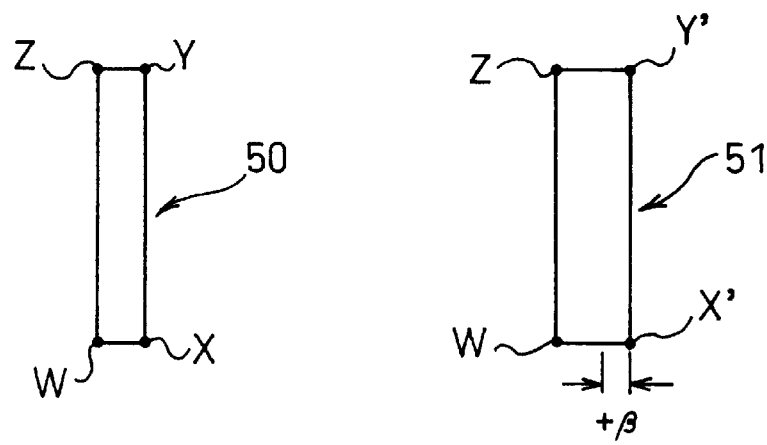
FIG. 25(a) is an explanatory view showing one example of transfer-deforming an element by the information processing device of FIG. 1.
Figure 25B:
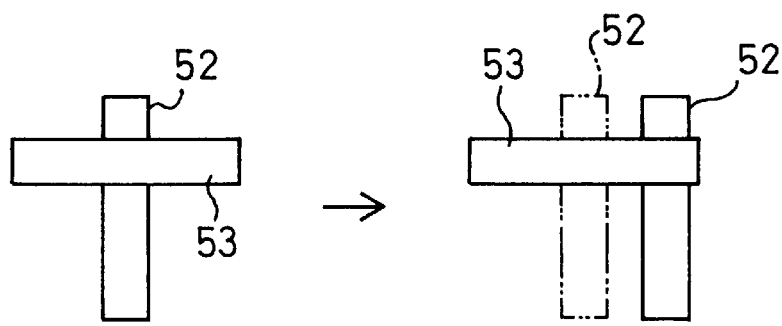
FIG. 25(b) is an explanatory view showing another example of transfer-deforming an element by the information processing device of FIG. 1.
Figure 25C:
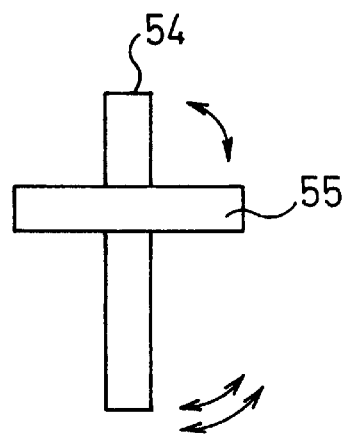
FIG. 25(c) is an explanatory view showing still another example of transfer-deforming an element by the information processing device of FIG. 1.

For example, in the case of enlarging an element, as shown in FIG. 25(*a*), among four outline points W, X, Y and Z of the element 50, only the outline point X is moved by +β. Then, by transferring the outline point Y parallel to the outline point X by +β using the amount of transfer β as the difference deformation data, the element 50 is enlarged to the element 51 composed of four outline points W, X', Y' and X. As described, since other outline points can be transferred based on the difference deformation data obtained by transferring only one outline point, the transfer-deformation process can be performed with a smaller amount of data compared with the case of storing the coordinate data after transfer for each skeleton point as shown in FIG. 8.

In the case of performing a parallel transfer of the element as in the same manner as the process shown in FIG. 25(*a*), for example, the parallel transfer can be performed by transferring all the outline points of the element 52 which is a longitudinal line of the elements 52 and 53 which cross each other by an equal amount as shown in FIG. 25(*b*).

Furthermore, as the respective elements of the graphic character can be deformed independently, as shown in FIG. 25(*c*), the deformation of the elements 54 and 55 can be set such that while the element 55 of the lateral line is being transferred in a direction of an arrow once, the element 54 of the longitudinal direction is transferred twice in a direction of an arrow.

In the described embodiment 1, the explanation of the transfer-deformation process is performed through the case of selecting a simple setting based on the graphic character data as set beforehand. It may be arranged such that the transfer-deformation processes of the elements are performed by altering the graphic character data as desired, as will be explained in the following embodiment 2.

Embodiment 2

The following descriptions will discuss another embodiment of the present invention with reference to the figures.

The basic structure of the information processing device of the present invention is the same as the information processing device of the embodiment 1 shown in the block diagram of FIG. 1, and members having the same functions as those of the embodiment 1 will be designated by the same reference numerals, and thus the descriptions thereof shall be omitted here.

The information processing device of the present embodiment is arranged such that the graphic character data as stored in the graphic character data memory section 4, the transfer data memory section 5, the deformation data memory section 6, the transfer time data memory section 7 and the reproducing time data memory section 8 are rewritten by parameter inputs from the input section 1. In the present embodiment, explanations on the parameter input will be explained through an example of a Chinese Character for "Dog". The parameter input screen is displayed on the input content display device 1*b*.

Figure 18:
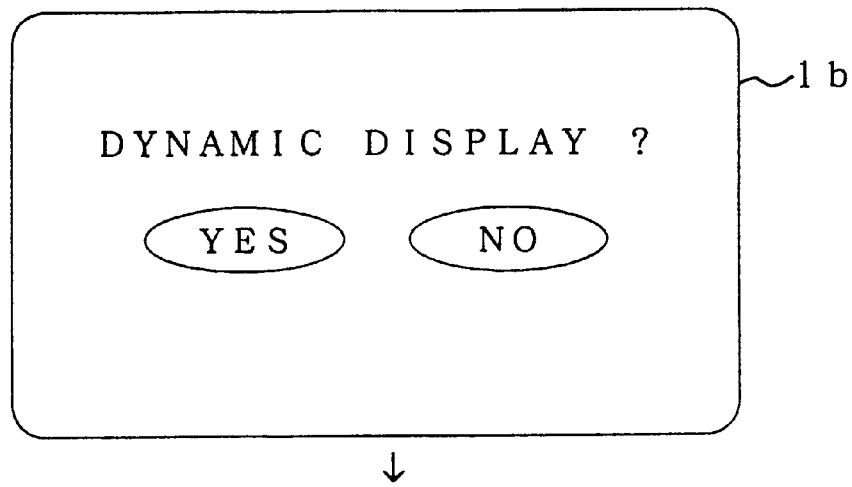
FIG. 18(a) through FIG. 18(c) are explanatory views respectively showing menu screens to be displayed on the input content display device of the information processing device of FIG. 1.
Figure 18:
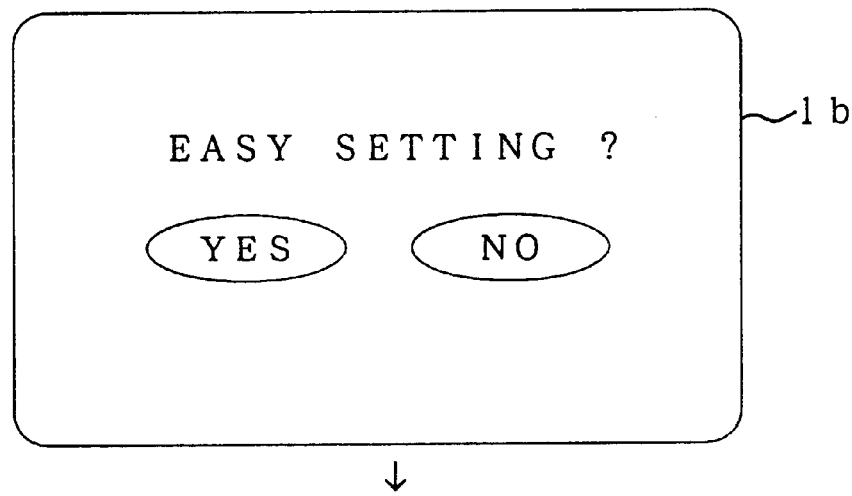
Figure 18:
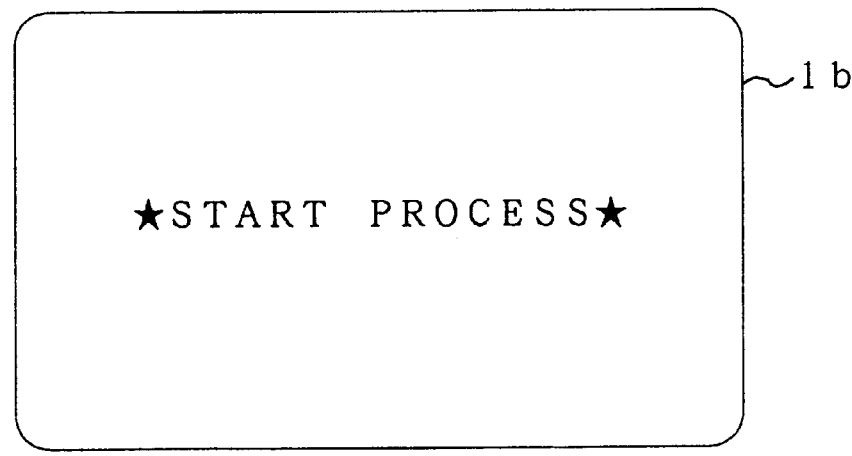

First, the parameter input function can be set by selecting "NO" as an answer to the message "Easy Setting?" on the selection screen shown in FIG. 18(*b*) of selecting the easy setting as explained in the Embodiment 1. Upon selecting the parameter input function, first, a stroke order code input screen (see FIG. 27) appears.

On the upper part of the transfer stroke order code input screen, a skeleton structure and a stroke order code corresponding to each skeleton are displayed based on the graphic character data as searched by the graphic character search section 9. With respect to the display screen, a cursor is moved on the skeleton subjected to the transfer and the skeleton is selected by making a double-click on it using a pointing device such as a mouse, etc. Then, the stroke order code of the skeleton as desired by the user is registered as the transfer stroke order code.

On the other hand, on the lower part of the transfer stroke order code input screen, the stroke order code as selected is displayed. As a result, the screen on the lower part of the stroke order code input screen is used, for example, to confirm the user's wish if the displayed stroke order code is specified. The screen on the lower part is also used as an input screen for inputting the stroke order code as displayed on the upper part by a normal input using, for example, a keyboard.

Figure 27:
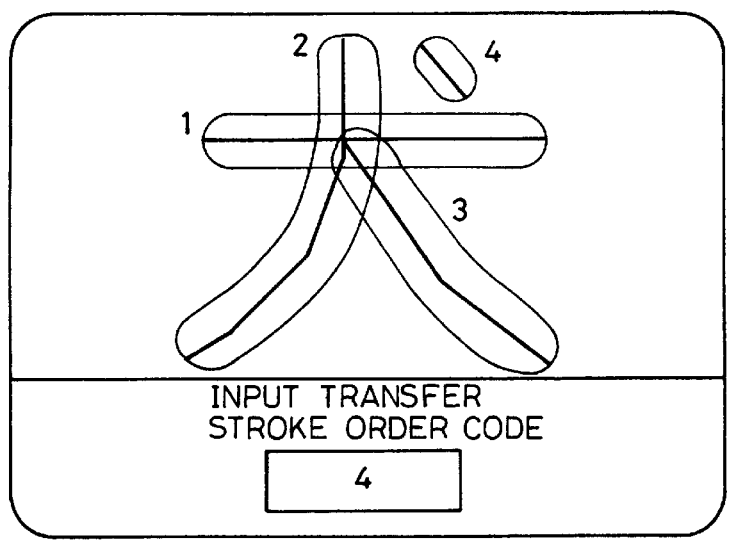
FIG. 27 is a drawing showing a screen for inputting parameters with regard to the transfer-deformation processes shown in the flowchart of FIG. 26.

On the transfer order code input screen shown in FIG. 27, for example, the Chinese Character for "Dog" is displayed with the stroke order codes corresponding to respective skeletons on the upper part, while the stroke order code (4) as specified by the user is displayed on the lower part. In FIG. 27 and in FIG. 28 through FIG. 35, the skeleton for the Chinese Character for "Dog" is shown in a thick line, while the outline is shown in a thin line.

Next, on the transfer stroke order code input screen, upon completing the input of the stroke order code, the next screen of the transfer type data input screen appears by pressing the return key.

Figure 28:
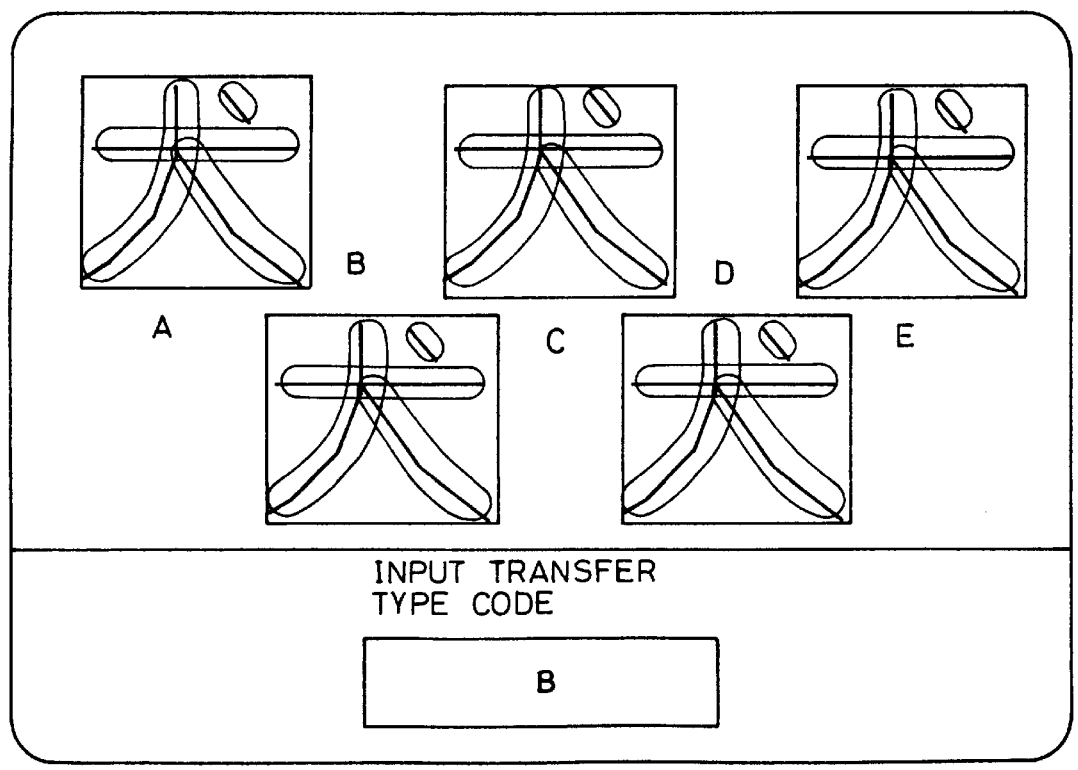
FIG. 28 is a drawing showing a screen for inputting parameters with regard to the transfer-deformation processes shown in the flowchart of FIG. 26.

As shown in FIG. 28, on the transfer type data input screen, the described upper part corresponds to the upper half of the screen shown in FIG. 28, and on the respective divided screens, the Chinese Character for "Dog" is displayed. To each Chinese Character for "Dog", is attached a symbol indicating the type of the transfer. Specifically, the symbol "A" indicates a parallel transfer, the symbol "B" indicates an inverse transfer, the symbol "C" indicates a rotation transfer, a symbol "D" indicates a skeleton transfer, and a symbol "E" indicates an outline deformation.

Based on the respective transfer type data, a demonstration display of the Chinese Character for "Dog" is performed. Namely, the input content display device 1b performs a demonstration display according to the transfer type on the transfer type data input screen.

Specifically, in the case where the transfer type code "A" representing the parallel transfer appears on the divided screen, for example, a dynamic display is performed by transferring the element as specified (hereinafter the element as specified is referred to as a registered stroke) to a position 10 dots below the original position, and then transferring the registered stroke back to the original position repetitively.

Additionally, in the case where the transfer type code "B" representing the inverse transfer is displayed on the divided screen, for example, using the skeleton code of the smallest skeleton code of the stroke order code as the reference point, a dynamic display is performed by inverting the registered stroke right to left and then transferring the registered stroke back to the original position repetitively.

In the case where the transfer type code "C" indicative of the rotation transfer is displayed on the divided screen, for example, a dynamic display is performed by rotating the registered stroke in a clockwise direction by 15° about the smallest stroke order code of the transferred stroke order code repetitively.

In the case where the transfer type code "D" indicative of the skeleton transfer is displayed on the divided screen, a dynamic display is performed, for example, by transferring the second smallest skeleton point of the transfer stroke order code by +10 dots in both x-direction and y-direction from the original position repetitively.

In the case where the transfer type code "E" indicative of the outline deformation is displayed on the divided screen, a dynamic display is performed, for example, by repetitively transferring outline points. Specifically, assumed here that the coordinate of the smallest outline point "s" of the outline point code corresponding to the transfer stroke order code be (sx, sy), all the outline points having y-coordinates in the positive direction with respect to the parallel line of the x-axis which passes through the outline point s are transferred by +5 dots, and all the coordinates having y-coordinates in the negative direction with respect to the parallel line are transferred by −5 dots in the y-direction repetitively, thereby performing a dynamic display.

As described, on the transfer type data input screen, upon selecting the transfer type of the registered stroke, the operation can be confirmed on the screen. Therefore, the type of the transfer can be specified by making a double click on the process as desired from the divided screen using a mouse, etc. Here, the transfer type code as specified, for example, the code "B", is displayed on the lower part of the transfer type data input screen.

On the lower part of the transfer type data input screen, the signal of the transfer type code as specified is output. As a result, the screen on the lower part of the stroke order code input screen is used, for example, to confirm the user's wish if the displayed stroke order code is specified. The screen on the lower part is also used as an input screen for inputting the stroke order code as displayed on the upper part by a normal input using, for example, a keyboard.

Then, if the transfer type code as displayed on the lower part of the transfer type data input screen coincides with the code as desired by the user, a return key is pressed. As a result, the transfer type code corresponding to the transfer stroke order code as stored in the transfer type data memory area 5a is rewritten.

On the transfer type data input screen shown in FIG. 28, for example, five Chinese Characters for "Dog" are displayed with the respective transfer type codes on the upper part, while the transfer type code "B" as selected by the user is displayed on the lower part.

On the transfer type data input screen, the transfer position data input screen according to the respective transfer types as specified will be explained.

Figure 29:
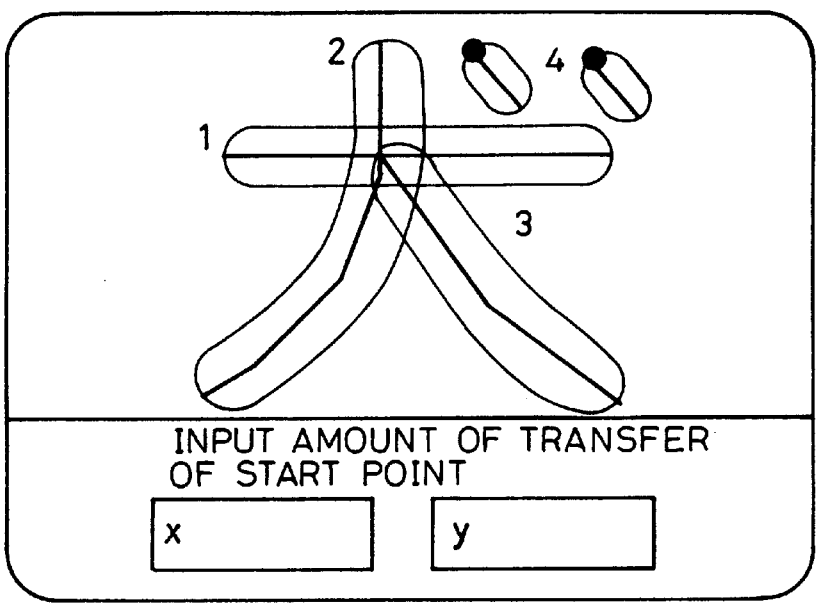
FIG. 29 is a drawing showing a screen for inputting parameters with regard to the transfer-deformation processes shown in the flowchart of FIG. 26.

First, on the transfer type data input screen, upon specifying the transfer type code "A", upon pressing the return key, the transfer position data input screen is output to the input content display device 1a for the parallel movement as shown in FIG. 29.

On the upper half of the transfer position data input screen, as the graphic character data, the skeleton data and the outline data and the skeleton point of the stroke corresponding to the transfer type code as input using the transfer stroke order code input screen are output.

Among the skeleton points of the registered stroke, the smallest skeleton point as the start portion of the stroke order of the registered stroke is flushed. By specifying the transfer position of the flushing skeleton point, the transfer position of the start point is determined. The respective x coordinate and y coordinate to be used for computing the respective amounts of the movement are reflected on the coordinate of each skeleton point of the registered stroke to carry out the parallel transfer of the registered stroke.

Before the stroke is actually transferred, the stroke after the transfer is displayed on the transfer position data input screen. As a result, the user can confirm the state of the stroke as transferred.

Additionally, when displaying the state of the registered stroke as transferred, the respective amounts of the transfer for the x-component and the y-component of the start point of the registered stroke are displayed.

On the lower part of the transfer position data input screen, the amount of the transfer of the start point of the registered stroke may be specified by the normal input using, for example, a keyboard, etc.

Therefore, on the transfer position data input screen, after the transfer position of the registered stroke is input by the mouse or the normal input, if the displayed position of the registered stroke is desired by the user, a return key is pressed. As a result, the transfer position data as stored in the transferred position indicative data memory area 5b are rewritten.

Figure 30:
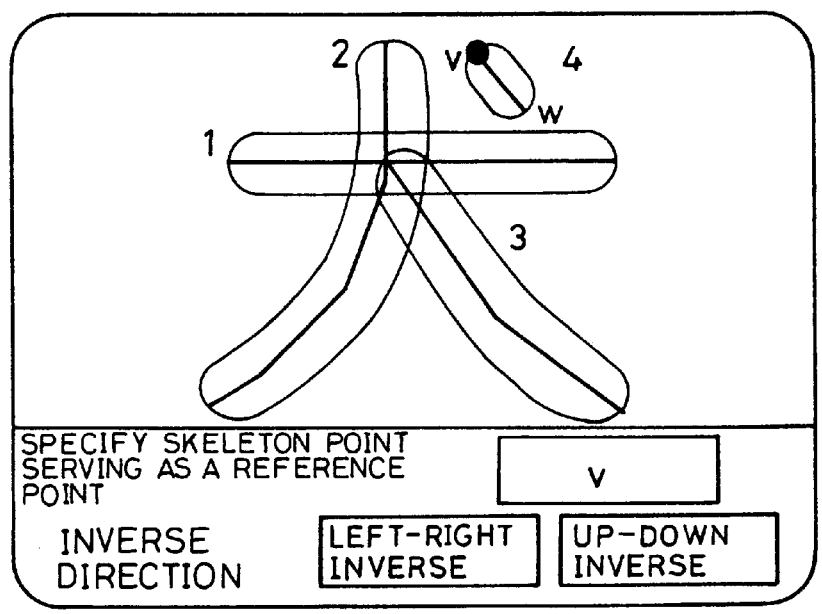
FIG. 30 is a drawing showing a screen for inputting parameters with regard to the transfer-deformation processes shown in the flowchart of FIG. 26.

On the transfer type data input screen, in the case where the transfer type code "B" is specified, upon pressing the return key, the transfer position data input screen for the inverse transfer is output to the input content display device 1b as shown in FIG. 30.

On the upper part of the transfer position data input screen, the skeleton data as well as the outline data are output as the graphic character data, and skeleton point of the registered stroke corresponding to the transfer stroke order code as input by the transfer stroke order code input screen is output.

With respect to the display screen, the user specifies the skeleton point which serves as a reference point for the inverse movement amount the skeleton point as displayed. Here, the skeleton point code of the skeleton point as specified is displayed on the lower part of the transfer position data input screen. In this example, between the two skeleton points "v" and "w" of the stroke order code (4), the skeleton point "v" is specified. Further, on the lower part of the transfer position data input screen, a command for specifying the inverse direction, i.e., the horizontal inverse or vertical inverse is specified. This command can be selected using a mouse or an arrow key of the keyboard, etc.

The registered stroke on the screen is displayed in the left to right inverse state with a reference point of the skeleton point as specified when selecting the left to right inverse, while being displayed in the up down inverse state with an axis of the skeleton point as specified upon selecting the up down inverse.

If the inverse state of the registered stroke as displayed is desired by the user, a return key is pressed. As a result, the deformation data as stored in the transferred position indicative data memory area 5b are rewritten.

Figure 31:
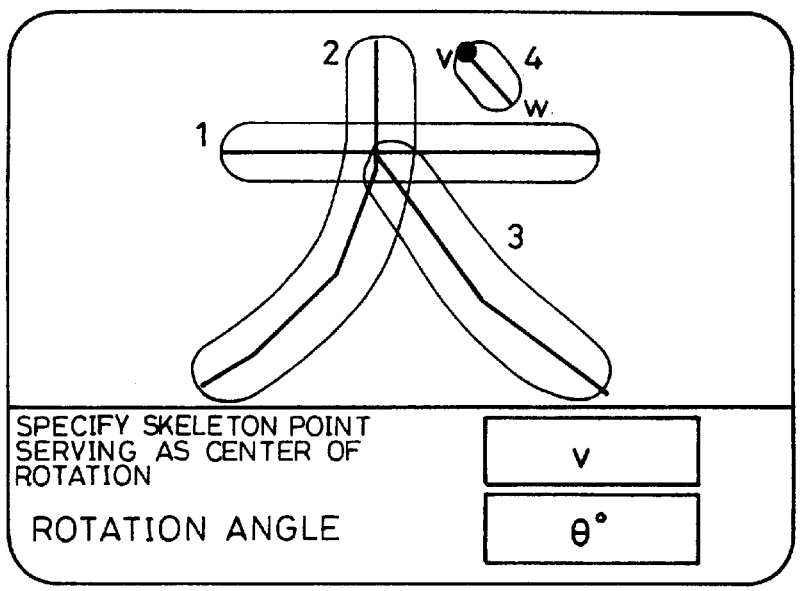
FIG. 31 is a drawing showing a screen for inputting parameters with regard to the transfer-deformation processes shown in the flowchart of FIG. 26.

In the case where the transfer type code "C" is specified using the transfer type data input screen, upon pressing the return key, the transfer position data input screen for the rotation transfer is output to the input content display device 1b as shown in FIG. 31.

On the upper part of the transfer position data input screen, as the graphic character data, the skeleton data and the outline data are output, and the skeleton point of the stroke corresponding to the transfer stroke order code as input using the stroke order code input screen are output.

With respect to the display screen, the skeleton point serving as the rotation center for the rotation transfer among the displayed skeleton points is specified using the mouse, etc. On the lower part of the transfer position input screen, the skeleton point as specified of the skeleton structure is displayed. Between the two skeleton points "v" and "w" of the transfer stroke order code (4), the skeleton point "v" is specified.

The rotation angle of the registered stroke can be specified by selecting the end point of the stroke excluding the skeleton point serving as a rotation center with the mouse, and the position in the desired direction of the rotation is specified using a mouse. When specifying the position, the position to which the skeleton point is actually moved, the end point is moved on the circle having a radius to the end point as selected.

Furthermore, on the lower part of the transfer position data input screen, the rotation angle θ° between before and after the transfer is displayed on the lower side of the transfer position data input screen.

The rotation angle to be output to the lower side of the transfer position data input screen can be specified also by means of a normal input using, for example, a keyboard, etc.

Therefore, if the rotation angle as displayed on the lower part of the transfer position data input screen is desired by the user, a return key is pressed. As a result, the deformation data as stored in the transferred position indicative data memory area 5b are rewritten.

Figure 32:
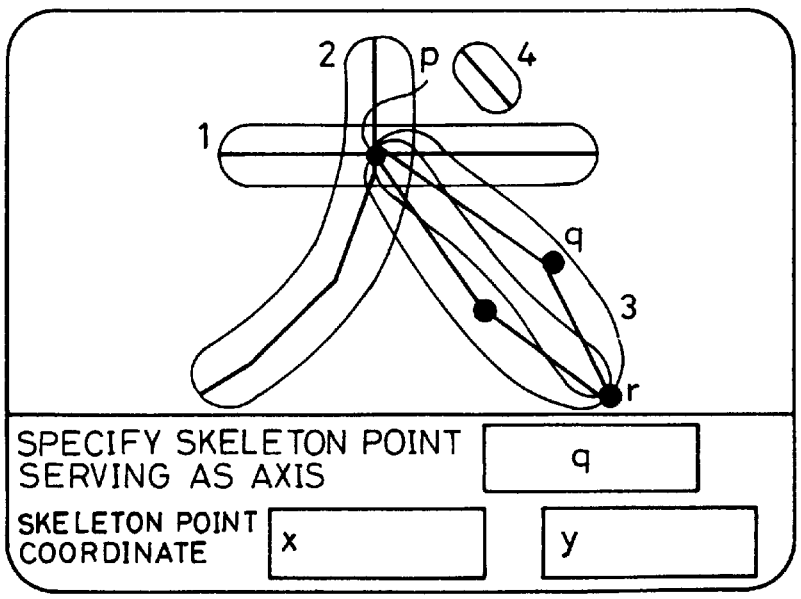
FIG. 32 is a drawing showing a screen for inputting parameters with regard to the transfer-deformation processes shown in the flowchart of FIG. 26.

In the case where the transfer type code "D" is specified using the transfer type data input screen, upon pressing the return key, the transfer position data input screen for the skeleton movement shown in FIG. 32 is output to the input content display device 1b. FIG. 32 shows the case of selecting (3) for the stroke order code.

On the upper part of the transfer position data input screen, the skeleton data and the outline data are output as the graphic character data, and all the skeleton points of the registered stroke corresponding to the transfer stroke order code as input using the transfer stroke order code input screen are output.

On the screen as displayed, the user specifies the skeleton point q to be transferred using, for example, a mouse among the skeleton points p, q and r to be displayed. Next, the position after the transfer is specified using the mouse. On the lower part of the transfer position data input screen, the skeleton point q as specified as well as the x coordinate and y coordinate of the transferred position are displayed.

The respective positions of the x and y coordinates of the transferred position to be output on the lower part of the transferred position data input screen can be set by a normal input using, for example, a keyboard.

Additionally, on the display, a position of the skeleton point after the transfer is displayed, and if the transferred position is desired by the user, a return key is pressed. As a result, the deformation data stored in the transferred position indicative data memory area 5b are rewritten.

Figure 33:
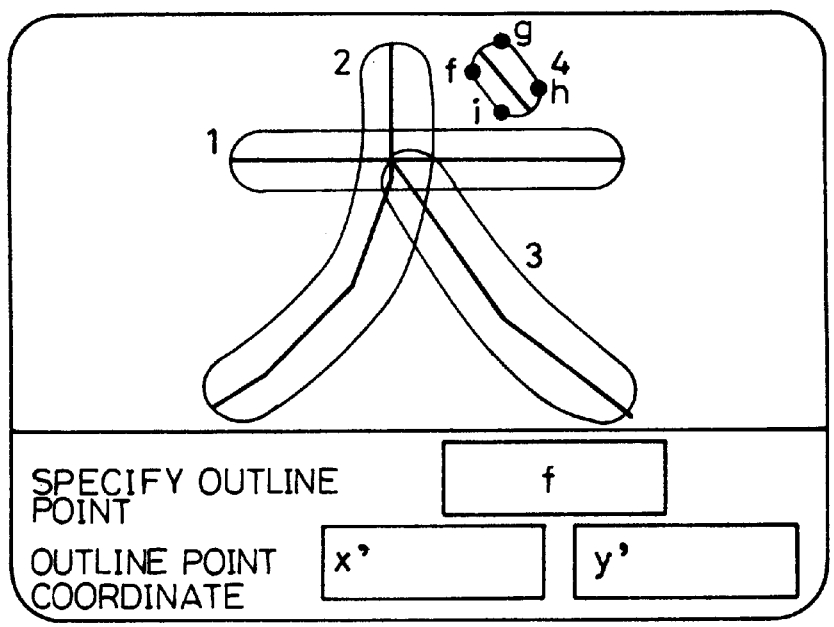
FIG. 33 is a drawing showing a screen for inputting parameters with regard to the transfer-deformation processes shown in the flowchart of FIG. 26.

In the case where the transfer type code "E" is specified on the transfer type data input screen, the transferred position data input screen for the outline deformation as shown in FIG. 33 is output to the input content display device 1b.

On the upper part of the transfer position data input screen, the skeleton data and the outline data are output as the graphic character data, and all the outline points of the registered stroke corresponding to the transfer stroke order code as input from the transfer stroke order code input screen are output.

With respect to this display screen, the user specifies the outline point a' to be transferred among the displayed outlines f, g, h and i using, for example, a mouse. The outline point f and the x'-coordinate and y'-coordinate of the transferred position are displayed on the lower part of the transferred position data input screen.

The x'-coordinate and y'-coordinate of the transferred position to be output on the lower part of the transferred position data input screen may be set by a normal input using, for example, a keyboard.

On the screen, a position of the outline point after the transfer is displayed, and if the transferred position is desired by the user, a return key is pressed. As a result, the deformation data stored in the deformation data memory section 6 are rewritten.

Figure 34:
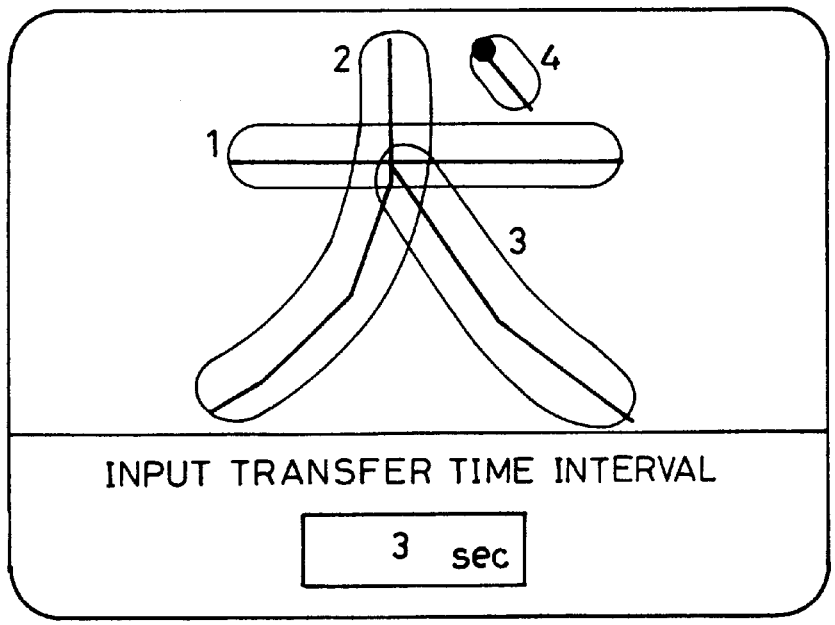
FIG. 34 is a drawing showing a screen for inputting parameters with regard to the transfer-deformation processes shown in the flowchart of FIG. 26.

On the transfer type data input screen shown in FIG. 28, the transfer type code as desired is specified, and a return key is pressed. Further, after specifying the transfer process corresponding to the transfer type code, the transferred position data input screens shown in FIG. 29 through FIG. 33 are switched to the transfer time data input screen as shown in FIG. 34.

The transfer time data input screen is for inputting a time for transferring the stroke subjected to the transfer from the original position to the transferred position. In an example shown in FIG. 34, a transfer time interval is selected to be 3 seconds.

Specifically, on the transfer time data input screen, the graphic character is displayed on the upper part, and a numerical value indicating the time as input on the lower part is displayed. Namely, by inputting the numerical value for the time on the lower part of the screen, the stroke as specified to transfer of the graphic character which is already displayed is displayed from the original position to the transferred position. If the time interval for the transfer is desired by the user, a return key is pressed. As a result, the transfer time data as stored in the transfer time data memory section 7 are rewritten.

Figure 35:
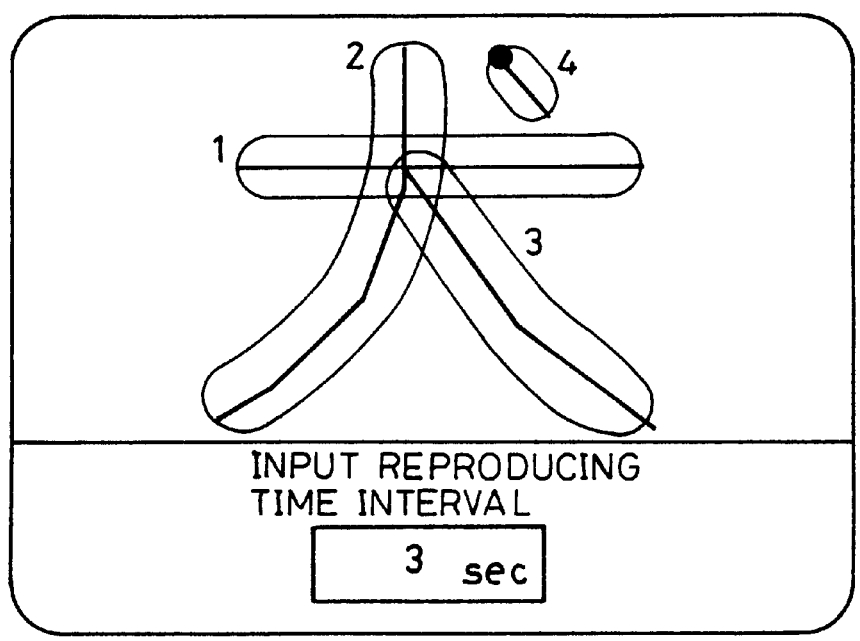
FIG. 35 is a drawing showing a screen for inputting parameters with regard to the transfer-deformation processes shown in the flowchart of FIG. 26.

Then, the transfer time data input screen is switched to the reproducing time data input screen as shown in FIG. 35.

On the transfer type data input screen, a time required for transferring the registered stroke subjected to the transfer from the original position to the transferred position is input. In an example shown in FIG. 35, 3 seconds are input for the reproducing time interval.

Specifically, on the reproducing time data input screen, the graphic character is displayed on the upper part, and the numerical value for the time as input is displayed on the lower part. Namely, on the lower part of the reproducing time data input screen, a time required for transferring the stroke back to the original position is input. Then, the registered stroke which constitutes the graphic character to be displayed on the upper part is displayed at the transfer time interval as input from the transfer time data input screen. Then, after the registered stroke is displayed at the transferred position according to the reproducing time interval, the registered stroke is displayed again at the original position.

The data as input using the transferred stroke order code input screen, the transferred position data input screen, the transfer time data input screen and the reproducing time data input screen in the described manner are transferred to the output buffer 14 in order. After all the items to be input have been input to the output buffer 14, the data are transferred to the work memory of the CPU 3, and a process of the element deformation is applied.

Regarding the parameter input process, explanations will be given referring to the flowcharts shown in FIG. 16, FIG. 17 and FIG. 26. In this example, explanations will be given through the case of adopting the Chinese Character for "Dog" for the graphic character to be transfer-deformed.

First, in S1 of the flowchart shown in FIG. 16 of the Embodiment 1, the character code "2404" and the character size "56 dots" are input by the input device 1a. Then, the graphic character data such as the character code, the character size, etc., are stored in the input buffer 2.

Figure 17:
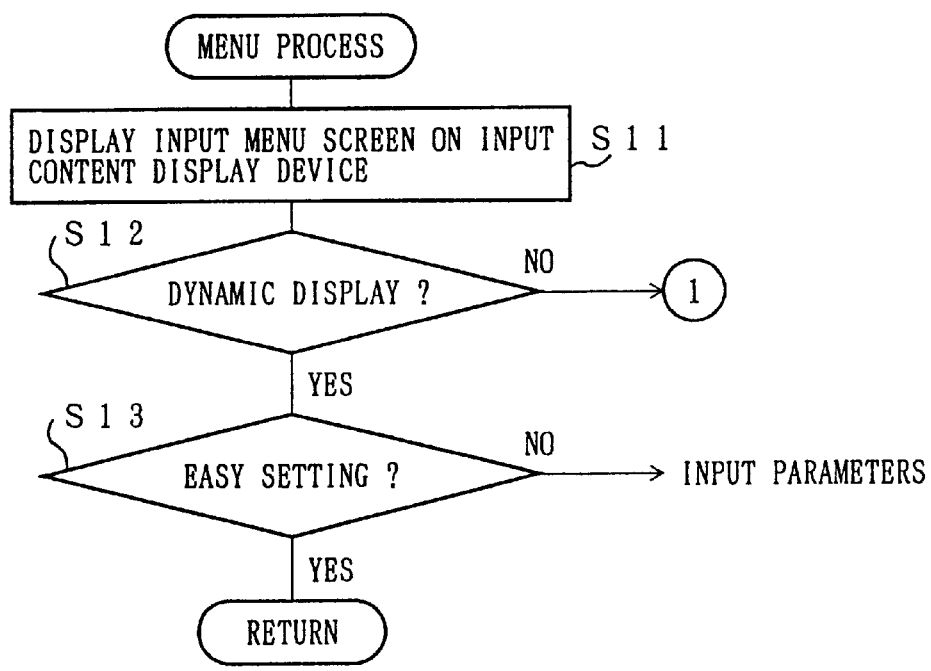
FIG. 17 is a flowchart showing a flow of processing information by the information processing device of FIG. 1.

Then, "NO" is selected for the message "Easy Setting?" in S13 of the flowchart shown in FIG. 17 of Embodiment 1.

Figure 26:
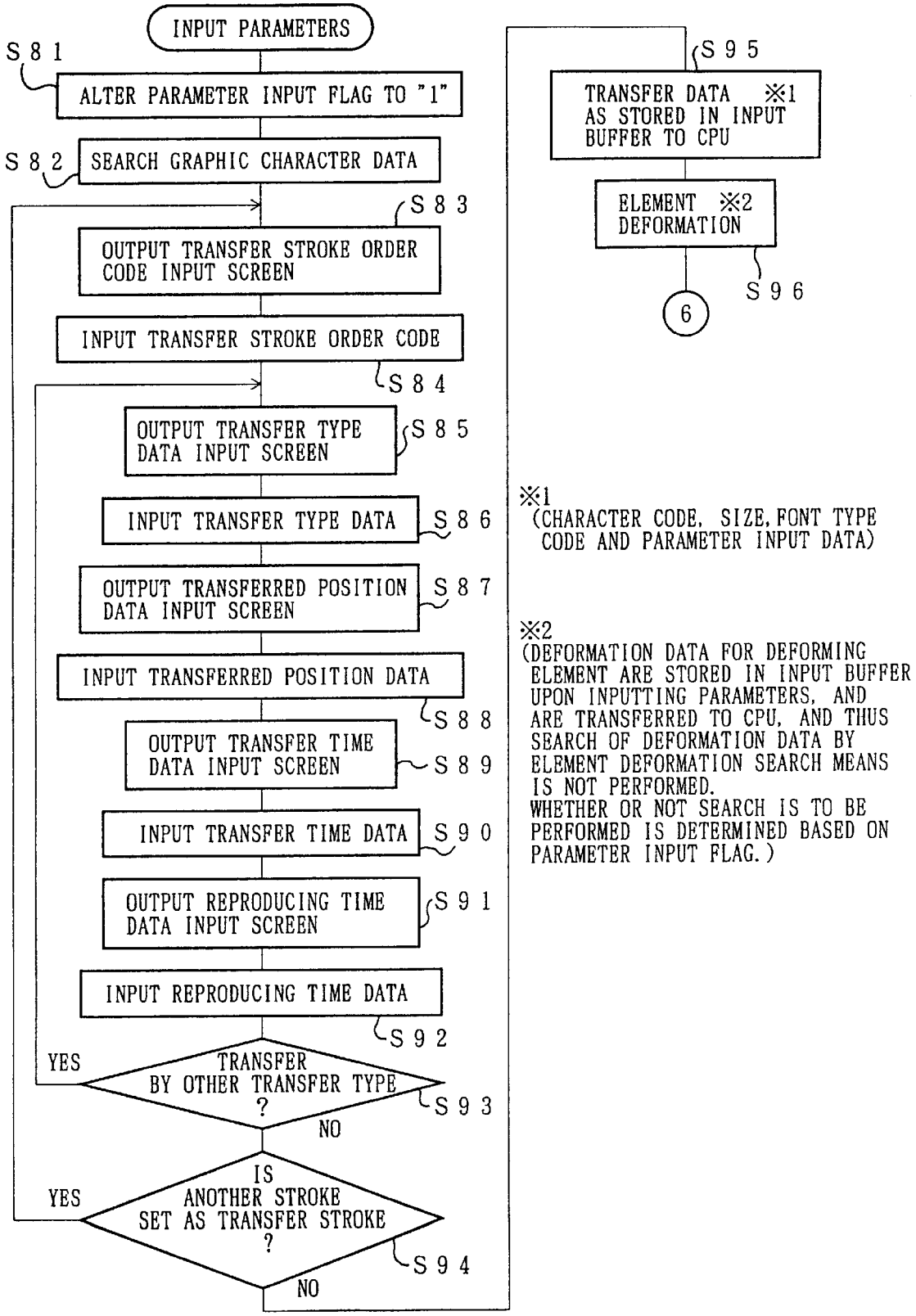
FIG. 26 is a flowchart showing a flow of processes by the information processing device in accordance with another embodiment of the present invention.

In this state, for the parameter input process, as shown in FIG. 26, the parameter input flag is altered to 1 by the CPU 3 (S81). Here, the parameter input flag "1" is stored in the input buffer 2.

Next, the graphic character data are searched (S82). Namely, the graphic character search section 9 searchs for the graphic character skeleton data having the same character code as the character code "2404" as stored in the input buffer 2, and the element outline data which constitutes the graphic character for the Chinese Character for "Dog" are retrieved from the graphic character skeleton data memory area 4a and the element outline data memory area 4b of the graphic character data memory section 4.

Thereafter, the transfer stroke order code input screen is displayed on the input content display device 1a (S83). Specifically, the input content display device 1b outputs the skeletons and the stroke order code for each skeleton on the screen as the transfer stroke order code input screen based on the graphic character skeleton data as searched by the graphic character search section 9 (see FIG. 27).

Next, the stroke order code is input (S84). Namely, to register the fourth stroke of the Chinese Character for "Dog" as displayed on the transfer order code input screen, the cursor is moved by the pointing device such as a mouse, etc., and the fourth stroke is specified by making a double click on it. After specifying the fourth stroke on the lower part of the transfer stroke order code input screen, it is confirmed if the display is the stroke order code as desired by the user. If it is the stroke order code as desired by the user, a return key is pressed.

Next, the transfer type data input screen is output to the input content display device 1b (S85). Namely, after the stroke order code is input, by pressing the return key, the input content display device 1b outputs the transfer type data input screen (see FIG. 28).

Then, the transfer time data is input (S86) Namely, among five transfer types displayed on the transfer type data input screen, in order to apply the reverse transfer to the fourth stroke of the Chinese Character for "Dog", the cursor is moved on the screen "B", and the fourth stroke is specified using a mouse. As a result, on the lower part of the transfer type data input screen, "B" is displayed for the transfer type code. After this display is confirmed, a return key is pressed.

Thereafter, the transferred position data input screen is output to the input content display device 1b (S87). Namely, after the transfer type code is input, upon pressing a return key, the input content display device 1b outputs the transferred position data input screen on the screen. Then, as the reverse transfer is selected, the Chinese Character for "Dog" is displayed on the transferred position data input screen, and skeleton points are displayed for the fourth stroke (see FIG. 30).

Then, the transfer position data are input (S88). Namely, after selecting the skeleton point "v" that is a start point among the skeleton points of the fourth stroke to be transferred using the mouse, a command for the left-right inverse is selected by the command shown in the lower part of the screen. On the upper part of the transferred position data input screen, a left to right inverse operation of the fourth stroke is displayed repetitively about the axis of the skeleton point "v". If this transfer operation is desired by the user, a return key is pressed.

Then, the transfer time data input screen is output to the input content display device 1b (S89) Namely, upon inputting the transferred position, and pressing the return key, the input content display device 1b outputs the transfer time data input screen onto the screen (S34).

Next, the transfer time data are input (S90) Namely, "3 seconds" is input by the lower part screen for the time interval for transferring the fourth stroke of the Chinese Character for "Dog" as output onto the upper part of the transfer time data input screen. Based on this input value, the fourth stroke displayed on the upper part performs a left-right inverse operation for 3 seconds. If this transfer time interval is desired by the user, a return key is pressed.

Thereafter, the reproducing time data input screen is input to the input content display device 1b (S91). Namely, after the transfer time data are input, upon pressing the return key, the input content display device 1b outputs the reproducing time data input screen (see FIG. 35).

Then, the reproducing time is input (S92). Namely, "4 seconds" is input by the lower part of the screen for the time interval for transferring the fourth stroke of the Chinese Character for "Dog" as output onto the upper part of the transfer time data input screen. Based on this input value, the fourth stroke displayed on the upper part performs a left-right inverse operation for 3 seconds and then transferring the stroke to the original position in 4 seconds. If this transfer time interval is desired by the user, a return key is pressed.

Then, upon completing the input for the first stroke data, it is determined if the same stroke is desired to be subjected to another type of transfer (S93). Namely, after all the data regarding the transfer of the fourth stroke are input, it is determined if the fourth stroke is transferred in another transfer type.

If the fourth stroke is not desired to be transferred by another type, a sequence is moved to S94. On the other hand, if the fourth stroke is transferred in another type, a sequence goes to S85.

In S94, after completing the setting of the stroke to be transferred of the Chinese Character for "Dog", it is determined if another stroke is selected as the transfer stroke. If another stroke is not set as a stroke to be transferred, a sequence goes to S95. On the another hand, if other set to transferred, a sequence goes back to S83.

All the data as input in each step are stored in the input buffer 2. Therefore, in S95, all the data in the input buffer 2 are transferred to the CPU 3. Here, the data to be transferred to the CPU 3 include character code, character size, font style code, and parameter input data (transfer stroke order code, the transfer type code, the transfer time, the reproducing time, etc.).

Lastly, the element deformation process is performed (S96). Namely, upon inputting the data to the work memory of the CPU 3, the element deformation process of S6 shown in the flowchart of FIG. 16 of embodiment 1 is performed.

For the parameter input process, since the parameter as input is transferred to the CPU 3 after the deformation data for deforming the element is stored in the input buffer 2, the search of the deformation data by the element deformation data search section 10 is not performed. Whether or not a search is to be performed is performed by the parameter input flag.

As described, according to the information processing device of the present embodiment, as the graphic character data as stored in the output buffer 14 in time series is transferred to the output section 16 by alternately switching the graphic character data, the output section 16 can alternately output the element before the transfer-deformation process is applied and the element after the transfer-deformation process is applied.

As a result, as only the element of the graphic character as described can be transfer-deformed, a dynamic image can be displayed on the screen in such a manner that only a part of the elements of the graphic character is being moved.

According to the information processing device, the transfer-deformation order of the element is shown on the menu screen to be displayed on the input content display device 1b, and user can confirm of the content of the transfer-deformation with ease.

Moreover, as the transfer-deformation can be performed according to an instruction given on the menu screen, even a complicated transfer-deformation process can be executed with accuracy with a simple input operation.

Furthermore, according to the information processing device of the present embodiment, as the element deforming section 13 can deform the element based on the coordinate position of the outline point of the element after the deformation, even for the graphic character of a complicated structure, by transferring only the outline points of the element, a precise deformation of the element can be performed without requiring a complicated process.

Furthermore, as the element deforming section 13 deforms the element based on the difference deformation data obtained from the outline point of the element of the original position and the outline point after the deformation, another element can be deformed using the difference deformation data of one outline point of the element. As a result, the deformation of the element outline data which constitute the element can be performed with a small amount of data.

Additionally, as the element deforming section 13 transfer-deforms the element based on the transfer type data such as a parallel transfer, an inverse transfer, a rotation transfer, a skeleton transfer, an outline deformation, etc., as stored in the transfer data memory section 5 as the transfer deformation data, the element can be transfer-deformed based on the type of the transfer-deformation. Moreover, as the transfer-deformation of the element is performed based on the data of at least one kind of the transfer-deformation type data, the transfer-deformation operations of a plurality of types can be performed at one time or sequentially.

Furthermore, according to the information processing device of the described arrangement, as the element deforming section 13 performs the transfer-deformation of the element about the axis of the skeleton point which constitutes the element of the graphic character, for example, the element can inverse or rotate about the axis of the skeleton point with ease.

The first information processing device of the present invention is characterized by including:

output means for outputting an element of an image composed of at least one element based on graphic character data such as coordinates of skeleton points and outline points of the element, etc.;

transfer-deformation data memory means for storing transfer-deformation data regarding a transfer-deformation of the element;

element transfer deformation means for transfer-deforming the element based on the transfer-deformation data as stored in the transfer-deformation data memory means;

an output buffer for storing in time series (i) graphic character data before the transfer-deformation of the element and (ii) graphic character data after the transfer-deformation of the element; and transfer means for alternately transferring (i) the graphic character data before the transfer-deformation of the element and (ii) the graphic character data after the transfer-deformation of the element as stored in the output buffer in time series to the output means by switching (i) the graphic character data and (ii) the graphic character data.

According to the described arrangement, the output means alternately outputs an element before a transfer-deformation and the element after the transfer-deformation, and only and the predetermined element of the graphic character can be transfer-deformed.

Therefore, the graphic character can be displayed on a display screen as a dynamic image in such a manner that only a predetermined portion of the element which constitutes the graphic character can be displayed. As a result, the user can easily display a dynamic image of the characters or drawings without requiring a complicated process.

The second information processing device of the present invention having an arrangement of the first information processing device is characterized by including:

input content display means for displaying a menu screen showing a transfer-deformation order of the element; and selection means for selecting the transfer-deformation order from the menu screen, wherein the element transfer deformation means transfer-deforms the element according to the transfer-deformation order as selected from the menu screen displayed on the input content display means.

The described arrangement of the second information processing device permits the transfer-deformation order of the element displayed on a menu screen of the input content display means, an effect of making the user recognize the content of the transfer-deformation with ease in addition to the effects as achieved from the first information processing device. Moreover, as the transfer-deformation can be performed according to an instruction from the menu screen, the user can execute even a complicated transfer-deformation process with ease.

The third information processing device of the present invention having the arrangement of the first or second information processing device is characterized in that the element transfer deformation means deforms the element based on coordinates of the outline points of the element after the transfer-deformation as stored in the transfer-deformation data memory means as the transfer-deformation data.

According to the described arrangement, in addition to the effects achieved from the first or second information processing device, as the element transfer defer-deformation means deforms the element based on the coordinate position of the outline point of the element after the deformation, only by transferring the outline point of the element, the element can be deformed with accuracy without requiring a complicated process.

The fourth information processing device having the arrangement of the first or second information processing device is arranged such that the element transfer deformation means deforms the element based on the difference deformation data obtained from a coordinate of the outline points of the element before the deformation and a coordinate of the outline point of the element after the deformation as stored in the transfer-deformation data memory means.

According to the described arrangement, in addition to the effects as achieved from the arrangement of the first or second information processing device, as the element transfer deformation means deforms the element based on the difference deformation data obtained from the coordinate of the outline point of the element before the deformation and the coordinate of the outline point of the element after the deformation, other elements can be deformed based on the difference deformation data of one outline point of the element. As a result, the deformation of the element outline point which constitutes the element can be performed using a small amount of data. The fifth information processing device of the present invention having the arrangement of the first or second information processing device is arranged such that the element transfer deformation means transfer-deforms the element based on at least one transfer-deformation data of a parallel transfer, an inverse transfer, a rotation transfer, a skeleton transfer, an outline deformation, etc., as stored in the transfer-deformation data memory means as transfer deformation data.

According to the described arrangement, in addition to the effects as achieved from the first or second information processing device, as the element transfer-deformation means transfer-deforms the element based on the transfer-deformation type data such as a parallel transfer, an inverse transfer, a rotation transfer, a skeleton transfer, an outline deformation, etc., as stored in the transfer-deformation memory means as transfer-deformation data, the element can be transferred according to the type of transfer-deformation. As a result, the user can transfer-deform the element by specifying the type of the transfer-deformation as desired.

The sixth information processing device of the present invention having the arrangement of the first or second information processing device is arranged such that the element transfer deformation means transfer-deforms the element about the skeleton point which constitutes the element of the graphic character.

According to the described arrangement, in addition to the effects as achieved from the first or second information processing device, as the element transfer-deformation means transfer-deforms the element about the skeleton point which constitutes the element of the graphic character, for example, the element can inverse or rotate about the skeleton point with ease.

The seventh information processing device of the present invention having the arrangement of the first or second information processing device is arranged such that transfer time data memory means for storing as transfer time data a time period from when the element is output to a coordinate before the transfer-deformation until the element is output to a coordinate of a position after the transfer-deformation; and reproducing time data memory means for storing a time interval from when the element is output to the coordinate after the transfer-deformation until when the element is again output to the coordinate of a position before the transfer-deformation, wherein the transfer means transfers the graphic character data of the element to the output means based on the transfer time data as stored in the transfer time data memory means and the reproducing time data as stored in the reproducing time data memory means.

According to the described arrangement, in addition to the effects as achieved from the first or second information processing device, as the transfer means transfers the graphic character data of the element to the output means based on the transfer time data as stored in the transfer time data memory means and the reproducing time data as stored in the reproducing time data memory means, the output means can shift the graphic character for each element. Namely, the output means alternately switches the output of the element before the transfer-deformation and the output of the element after the transfer-deformation based on the transfer time data as stored in the transfer time data memory means and the reproducing time data as stored in the reproducing time data memory means. As a result, a dynamic display of the graphic character can be performed with ease.

The eighth information processing device of the present invention having the arrangement of the first information processing device is arranged to include data input means for inputting the graphic character data and the transfer-deformation data of the element of the graphic character, wherein the element transfer deformation means transfer-deforms the element based on the graphic character data and the transfer-deformation data as input by the data input means.

According to the described arrangement, in addition to the effects as achieved from the arrangement of the first information processing device, as the element transfer-deformation means transfer-deforms the element based on the graphic character data and the transfer element data as input by the data input means, the element as selected by the user can be transfer-deformed as desired. As a result, an improved convenience of the user of the information processing device can be achieved.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. An information processing device comprising:

transfer-deformation processing means for independently transfer-deforming at least one of divided plurality of elements which constitute an image of a single graphic character; and output means for alternately outputting first display data regarding an element of the image that has been transfer-deformed by said transfer-deformation processing means and second display data rewarding the element before being transfer-deformed by said transfer-deformation processing means by switching said first display data and said second display data, thereby outputting a dynamic image, wherein said output means includes:

a display device;

an output section for outputting said first display data and said second display data to said display device;

an output buffer for storing said first display data and said second display data in time series; and transfer means for alternately transferring said first display data and said second display data as stored in said output buffer in time series by switching said first display data and said second display data.

2. An information processing device comprising:

transfer-deformation processing means for independently transfer-deforming at least one of divided plurality of elements which constitute an image of a single graphic character;

output means for alternately outputting first display data regarding an element of the image that has been transfer-deformed by said transfer-deformation processing means and second display data regarding the element before being transfer-deformed by said transfer-deformation processing means by switching said first display data and said second display data, thereby outputting a dynamic image;

transfer time data memory means for storing as transfer time data a time period from when the element is output to a coordinate of a position before the transfer-deformation until the image is output to a coordinate of a position after the transfer-deformation; and reproducing time data memory means for storing a time period from when the element is output to the coordinate of the position after the transfer-deformation until the element is output to the coordinate of the position before the transfer-deformation, wherein said output means switches said first display data and said second display data based on transfer time data as stored in said transfer time data memory means and the reproducing time data as stored in said reproducing time data memory means.

3. The information processing device as set forth in claim 2, wherein:

in relation to a character code of the graphic character and a number of skeletons of the elements which constitute the graphic character, said transfer time data memory means stores the number of skeleton points of each element and skeleton point codes defining the skeleton points of each element, and in relation to the character code and the number of skeletons, said reproducing time data memory means stores a reproducing time interval corresponding to a number of skeleton points and the skeleton point codes of each element.

4. An information processing device comprising:

output means for outputting an element of an image composed of at least one element based on graphic character data such as coordinates of skeleton points and outline points of the element, etc.;

transfer-deformation data memory means for storing transfer-deformation data regarding a transfer-deformation of the element;

element transfer deformation means for transfer-deforming the element based on the transfer-deformation data as stored in said transfer-deformation data memory means;

an output buffer for storing in time series (i) graphic character data before the transfer-deformation of the element and (ii) graphic character data after the transfer-deformation of the element; and transfer means for alternately transferring (i) the graphic character data before the transfer-deformation of the element and (ii) the graphic character data after the transfer-deformation of the element as stored in said output buffer in time series to said output means by switching (i) the graphic character data and (ii) the graphic character data.

5. The information processing device as set forth in claim 4, further comprising:

input content display means for displaying a menu screen showing a transfer-deformation order of the element; and selection means for selecting the transfer-deformation order from said menu screen, wherein said element transfer deformation means transfer-deforms the element according to the transfer-deformation order as selected from the menu screen displayed on said input content display means.

6. The information processing device as set forth in claim 4, wherein:

said element transfer deformation means deforms the element based on coordinates of the outline points of the element after the transfer-deformation as stored in said transfer-deformation data memory means as the transfer-deformation data.

7. The information processing device as set forth in claim 4, wherein:

said element transfer deformation means deforms the element based on difference deformation data obtained from coordinates of a position of the outline points of the element before the deformation and coordinates of a position of the outline points of the element after the deformation as stored in said transfer-deformation data memory means.

8. The information processing device as set forth in claim 4, wherein:

said element transfer deformation means transfer-deforms the element based on at least one transfer-deformation data selected from the group consisting of a parallel transfer, an inverse transfer, a rotation transfer, a skeleton transfer, and an outline deformation, as stored in said transfer-deformation data memory means.

9. The information processing device as set forth in claim 4, wherein:

said element transfer deformation means transfer-deforms the element about a skeleton point of the element of the graphic character.

10. The information processing device as set forth in claim 4, further comprising:

transfer time data memory means for storing as transfer time data a time period from when the element is output to a coordinate of a position before the transfer-deformation until the element is output to a coordinate of a position after the transfer-deformation; and reproducing time data memory means for storing a time interval from when the element is output to the coordinate of the position after the transfer-deformation until the element is again output to the coordinate of the position before the transfer-deformation, wherein said transfer means transfers the graphic character data of the element to said output means based on the transfer time data as stored in said transfer time data memory means and the reproducing time data as stored in said reproducing time data memory means.

11. The information processing device as set forth in claim 4, further comprising:

data input means for inputting the graphic character data and the transfer-deformation data of the element of the graphic character, wherein said element transfer deformation means transfer-deforms the element based on the graphic character data and the transfer-deformation data as input by said data input means.

12. A recording medium for recording thereon a program readable by a computer, said program being designed for making the computer execute an information processing, said information processing comprising the steps of:

independently carrying out a transfer-deformation process of at least one of divided elements which constitute a single graphic character;

alternately outputting first display data regarding the element as being transfer-deformed and second display data regarding the element before being transfer-deformed by switching said first display data and said second display data, thereby outputting a dynamic image;

reading out data of a time interval according to a type of transfer-deformation as desired from time data memory means for storing data of a switching time interval for alternately outputting said first display data and said second display data; and alternately outputting said first display data and said second display data by switching them based on the data of the switching time interval as read.

13. A recording medium for recording thereon a program readable by a computer, said program being designed for making the computer execute an information processing, said information processing comprising the steps of:

independently carrying out a transfer-deformation process of at least one of divided elements which constitute a single graphic character;

alternately outputting first display data regarding the element as being transfer-deformed and second display data regarding the element before being transfer-deformed by switching said first display data and said second display data, thereby outputting a dynamic image;

displaying a menu screen showing a transfer-deformation order of the element;

transfer-deforming the element according to the transfer-deformation order as selected from the menu screen by selection means;

displaying a transfer type data input screen for selecting a transfer type to be applied to the element; and performing a demonstration display on the transfer type data input screen according to a type of transfer.

14. A recording medium as set forth in claim 13, wherein said information processing further comprises the step of:

displaying a transferred position data input screen for displaying a transferred position of the element after being transfer-deformed.

15. A recording medium for recording thereon a program readable by a computer, said program being designed for making the computer execute an information processing, said information processing comprising the steps of:

independently carrying out a transfer-deformation process of at least one of divided elements which constitute a single graphic character;

alternately outputting first display data regarding the element as being transfer-deformed and second display data regarding the element before being transfer-deformed by switching said first display data and said second display data, thereby outputting a dynamic image;

displaying a menu screen showing a transfer-deformation order of the element;

transfer-deforming the element according to the transfer-deformation order as selected from the menu screen by selection means; and displaying a transfer time data input screen for inputting transfer time data from when the element is output to a coordinate of a position before the transfer-deformation until the element is output to a coordinate of a position after the transfer-deformation.

16. A recording medium for recording thereon a program readable by a computer, said program being designed for making the computer execute an information processing, said information processing comprising the steps of:

independently carrying out a transfer-deformation process of at least one of divided elements which constitute a single graphic character;

alternately outputting first display data regarding the element as being transfer-deformed and second display data regarding the element before being transfer-deformed by switching said first display data and said second display data, thereby outputting a dynamic image;

displaying, a menu screen showing a transfer-deformation order of the element;

transfer-deforming the element according to the transfer-deformation order as selected from the menu screen by selection means; and displaying a reproducing time data input screen for inputting reproducing time data from when the element is output to a coordinate of a position after the transfer-deformation until the element is output again to a coordinate of a position the element before the transfer-deformation.

* * * * *